(12) United States Patent
Marek et al.

(10) Patent No.: US 12,657,482 B1
(45) Date of Patent: Jun. 16, 2026

(54) AUGMENTATION OF GRAPH NETWORKS

(71) Applicant: THE HUNTINGTON NATIONAL BANK, Columbus, OH (US)

(72) Inventors: Dean A Marek, Columbus, OH (US); Jason W. Black, Columbus, OH (US)

(73) Assignee: The Huntington National Bank, Columbus, OH (US)

( * ) Notice: Subject to any disclaimer, the term of this patent is extended or adjusted under 35 U.S.C. 154(b) by 0 days.

(21) Appl. No.: 19/371,142

(22) Filed: Oct. 28, 2025

(51) Int. Cl.
| | |
|---|---|
| *G06N 3/04* | (2023.01) |
| *G06F 18/22* | (2023.01) |
| *G06F 40/274* | (2020.01) |
| *G06N 3/0475* | (2023.01) |
| *G06N 5/02* | (2023.01) |
| *G06N 5/022* | (2023.01) |

(52) U.S. Cl.
CPC ............ *G06N 5/022* (2013.01); *G06F 18/22* (2023.01); *G06F 40/274* (2020.01); *G06N 3/0475* (2023.01)

(58) Field of Classification Search
CPC ............ G06N 5/05; G06N 5/022; G06N 5/04; G06N 5/046; G06N 20/00; G06N 5/00; G06N 99/00
See application file for complete search history.

(56) References Cited

U.S. PATENT DOCUMENTS

| | | | | |
|---|---|---|---|---|
| 11,442,992 B1 * | 9/2022 | Moon | ............... | G06F 16/90332 |
| 12,353,477 B2 * | 7/2025 | Lisuk | ............... | G06F 16/90344 |
| 12,524,475 B2 * | 1/2026 | Wilcox | ................... | G06F 16/93 |
| 2018/0075359 A1 * | 3/2018 | Brennan | ................ | G06N 5/022 |
| 2019/0042988 A1 * | 2/2019 | Brown | ................ | G06F 16/9535 |
| 2020/0104746 A1 * | 4/2020 | Strope | .................... | G06N 20/00 |
| 2021/0191925 A1 * | 6/2021 | Sianez | ..................... | G06N 3/04 |
| 2022/0207066 A1 * | 6/2022 | Gangwar | ............. | G06N 3/0442 |
| 2023/0169059 A1 * | 6/2023 | Flöther | ................ | G06F 16/906 |
| | | | | 707/639 |
| 2023/0205797 A1 * | 6/2023 | Das | ................... | G06F 16/90332 |
| | | | | 704/9 |
| 2023/0343323 A1 * | 10/2023 | Baeuml | ................... | G10L 13/10 |
| 2024/0005181 A1 * | 1/2024 | Chajewska | ............ | G06N 20/00 |

(Continued)

OTHER PUBLICATIONS

Barron et al., "Domain-Specific Retrieval-Augmented Generation Using Vector Stores, Knowledge Graphs, and Tensor Factorization", Oct. 3, 2024, arXiv.com, pp. 1-8 (Year: 2024).*

(Continued)

*Primary Examiner* — Paulinho E Smith
(74) *Attorney, Agent, or Firm* — Kilpatrick Townsend & Stockton LLP

(57) ABSTRACT

Techniques are described herein for provided for augmenting graph networks. Upon receiving a request from an edge device, a graph system prompts a generative model and compares its output to a first graph network of nodes and edges based on similarity scores and degrees of separation. If an adequate response is not found, the graph system identifies and evaluates a second set of nodes outside the first graph network, extracts relevant metadata, and creates a second graph network with new relationships. Contextual natural language is generated from the metadata to form a response, which is returned to the edge device, and may involve controlling one or more assets or devices in response to the context of the request and/or the response.

20 Claims, 9 Drawing Sheets

(56)                        References Cited

U.S. PATENT DOCUMENTS

| | | | |
|---|---|---|---|
| 2024/0028958 A1* | 1/2024 | Ni | G06N 20/00 |
| 2024/0062111 A1* | 2/2024 | Strope | G06N 20/00 |
| 2025/0013655 A1* | 1/2025 | Mohanty | G06F 16/258 |
| 2025/0061312 A1* | 2/2025 | Heiler | G06N 3/0475 |
| 2025/0111192 A1* | 4/2025 | Bayless | G06N 3/006 |
| 2025/0112878 A1* | 4/2025 | Bayless | H04L 51/02 |
| 2025/0232029 A1* | 7/2025 | Gasperowicz | G06F 21/53 |
| 2025/0278419 A1* | 9/2025 | Mui | G06F 40/295 |
| 2025/0291854 A1* | 9/2025 | Ho | G06F 16/93 |
| 2025/0310358 A1* | 10/2025 | Gulikers | H04L 63/1425 |
| 2026/0023786 A1* | 1/2026 | Choubey | G06F 16/90332 |
| 2026/0024457 A1* | 1/2026 | Aboel-Nil | G09B 7/04 |

OTHER PUBLICATIONS

Morgen et al., "Connect, Understand and Learn: Dynamic Knowledge Graph Transforms Learning", 2024, 47th MIPRO ICT and Electronics Convention, pp. 235-240 (Year: 2024).*
Michael Ryan, "Knowledge Graph Augmented Natural Language Question Answering", Oct. 2, 2024, pp. 1-41. (Year: 2024).*
Zhu et al., "Enhancing Large Language Models with Knowledge Graphs for Robust Question Answering", 2024, IEEE 30th International Conference on Parallel and Distributed Systems (ICPADS), pp. 262-269. (Year: 2024).*

\* cited by examiner

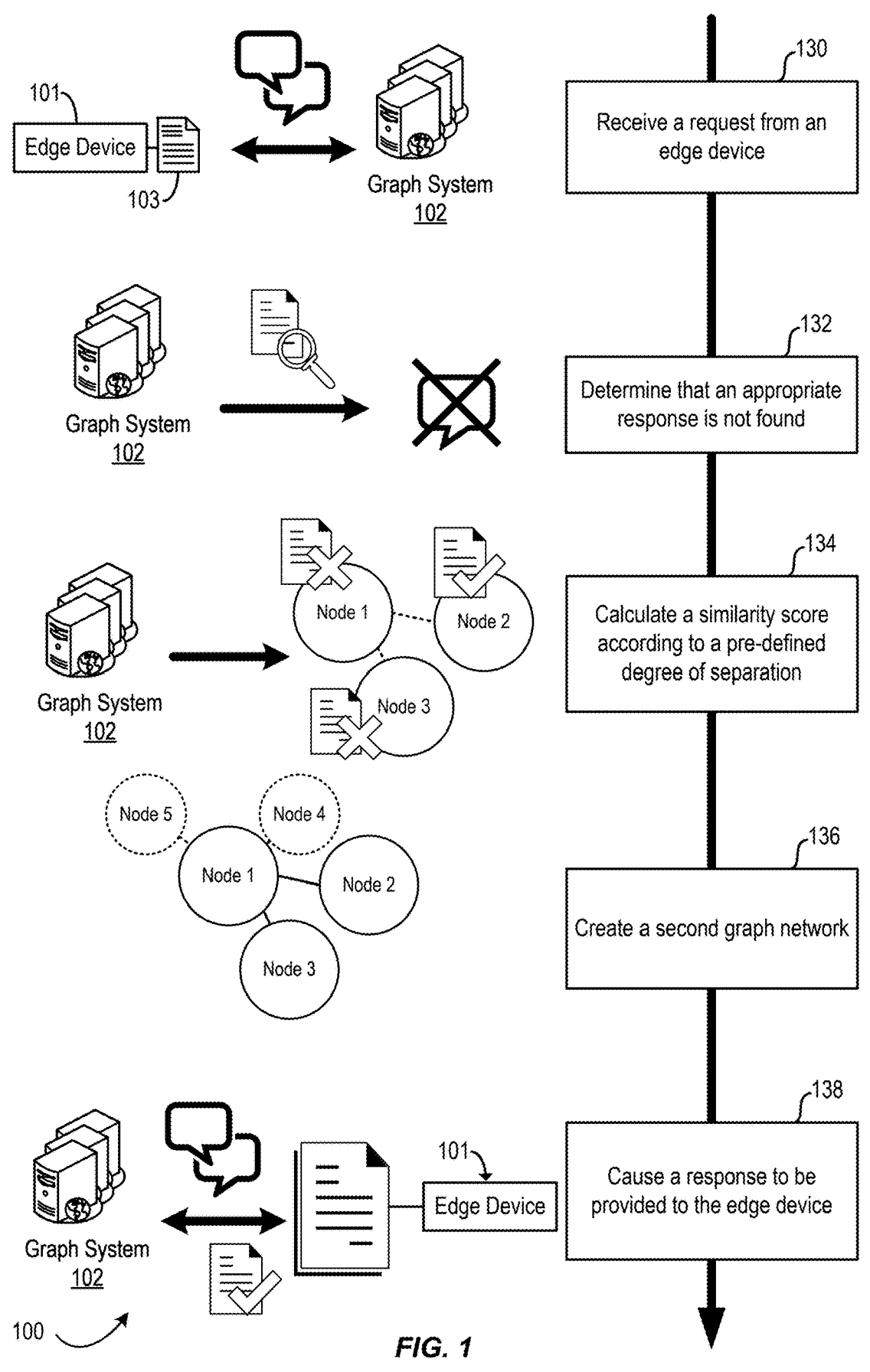

101

Edge Device

103

Graph System
102

Graph System
102

Graph System
102

Node 1    Node 2

Node 3

Node 5    Node 4

Node 1    Node 2

Node 3

Graph System
102

101

Edge Device

100

130

Receive a request from an edge device

132

Determine that an appropriate response is not found

134

Calculate a similarity score according to a pre-defined degree of separation

136

Create a second graph network

138

Cause a response to be provided to the edge device

*FIG. 1*

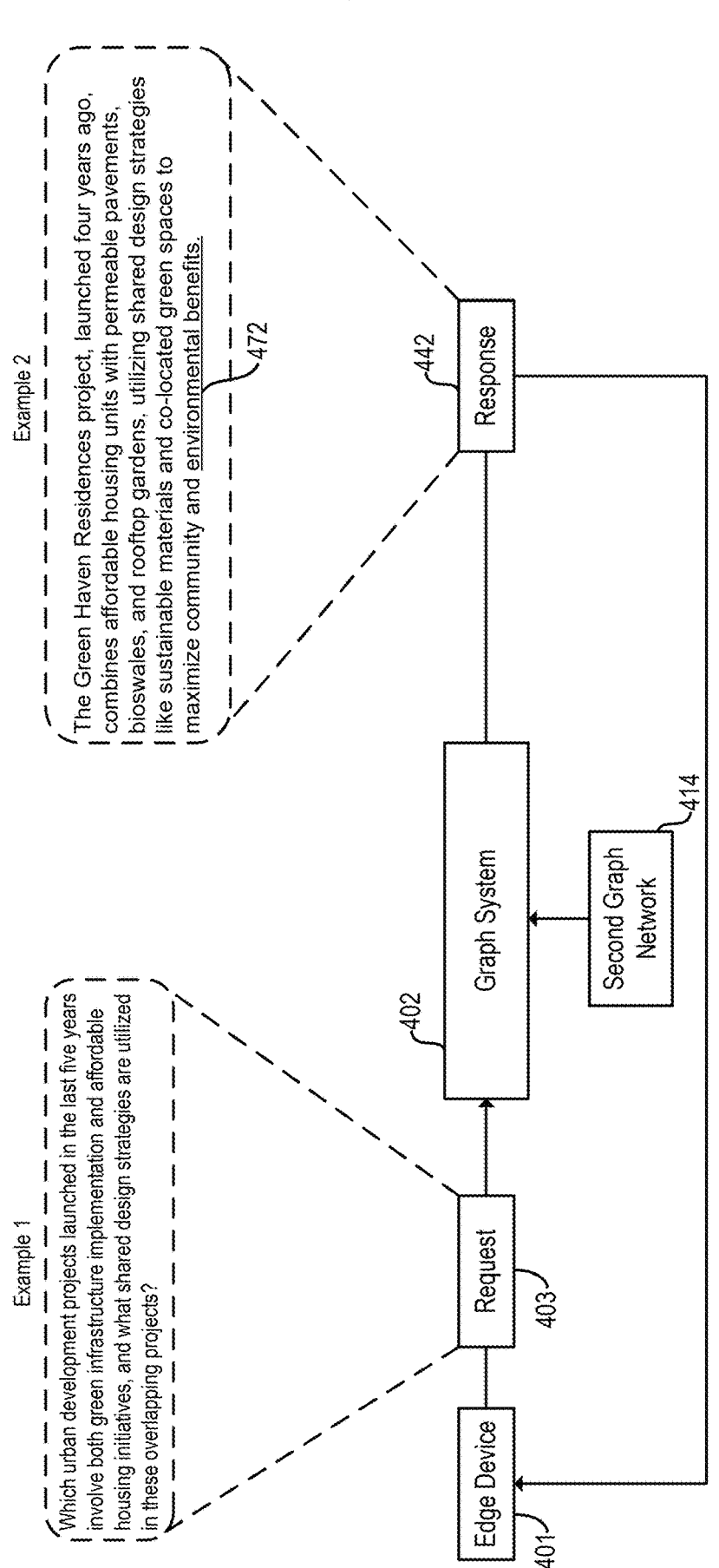

Example 1

Which urban development projects launched in the last five years involve both green infrastructure implementation and affordable housing initiatives, and what shared design strategies are utilized in these overlapping projects?

Example 2

The Green Haven Residences project, launched four years ago, combines affordable housing units with permeable pavements, bioswales, and rooftop gardens, utilizing shared design strategies like sustainable materials and co-located green spaces to maximize community and environmental benefits.

472

442

Response

402

Graph System

414

Second Graph Network

403

Request

401

Edge Device

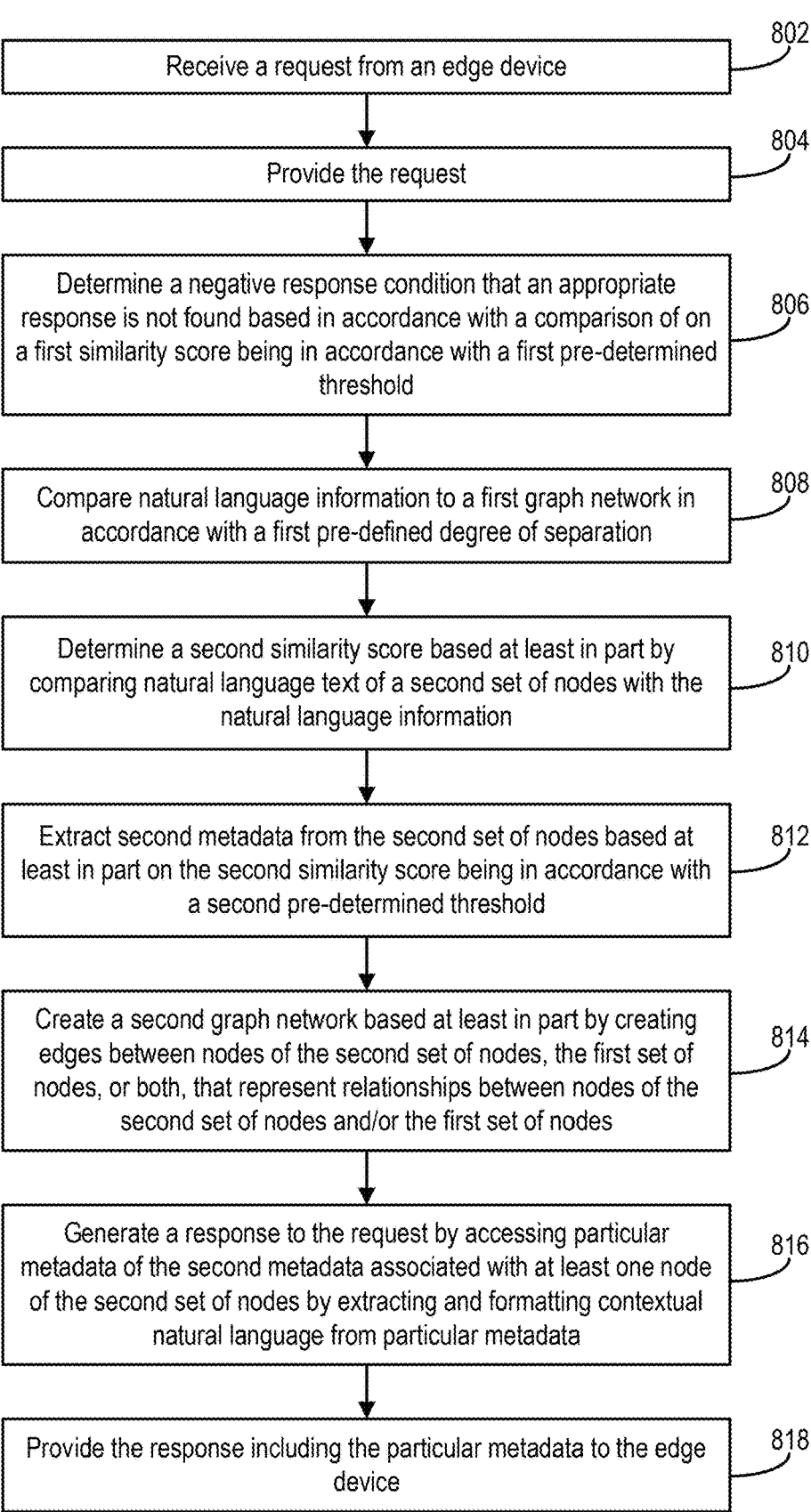

802 Receive a request from an edge device

804 Provide the request

806 Determine a negative response condition that an appropriate response is not found based in accordance with a comparison of on a first similarity score being in accordance with a first pre-determined threshold 808 Compare natural language information to a first graph network in accordance with a first pre-defined degree of separation 810 Determine a second similarity score based at least in part by comparing natural language text of a second set of nodes with the natural language information 812 Extract second metadata from the second set of nodes based at least in part on the second similarity score being in accordance with a second pre-determined threshold 814 Create a second graph network based at least in part by creating edges between nodes of the second set of nodes, the first set of nodes, or both, that represent relationships between nodes of the second set of nodes and/or the first set of nodes 816 Generate a response to the request by accessing particular metadata of the second metadata associated with at least one node of the second set of nodes by extracting and formatting contextual natural language from particular metadata 818 Provide the response including the particular metadata to the edge device

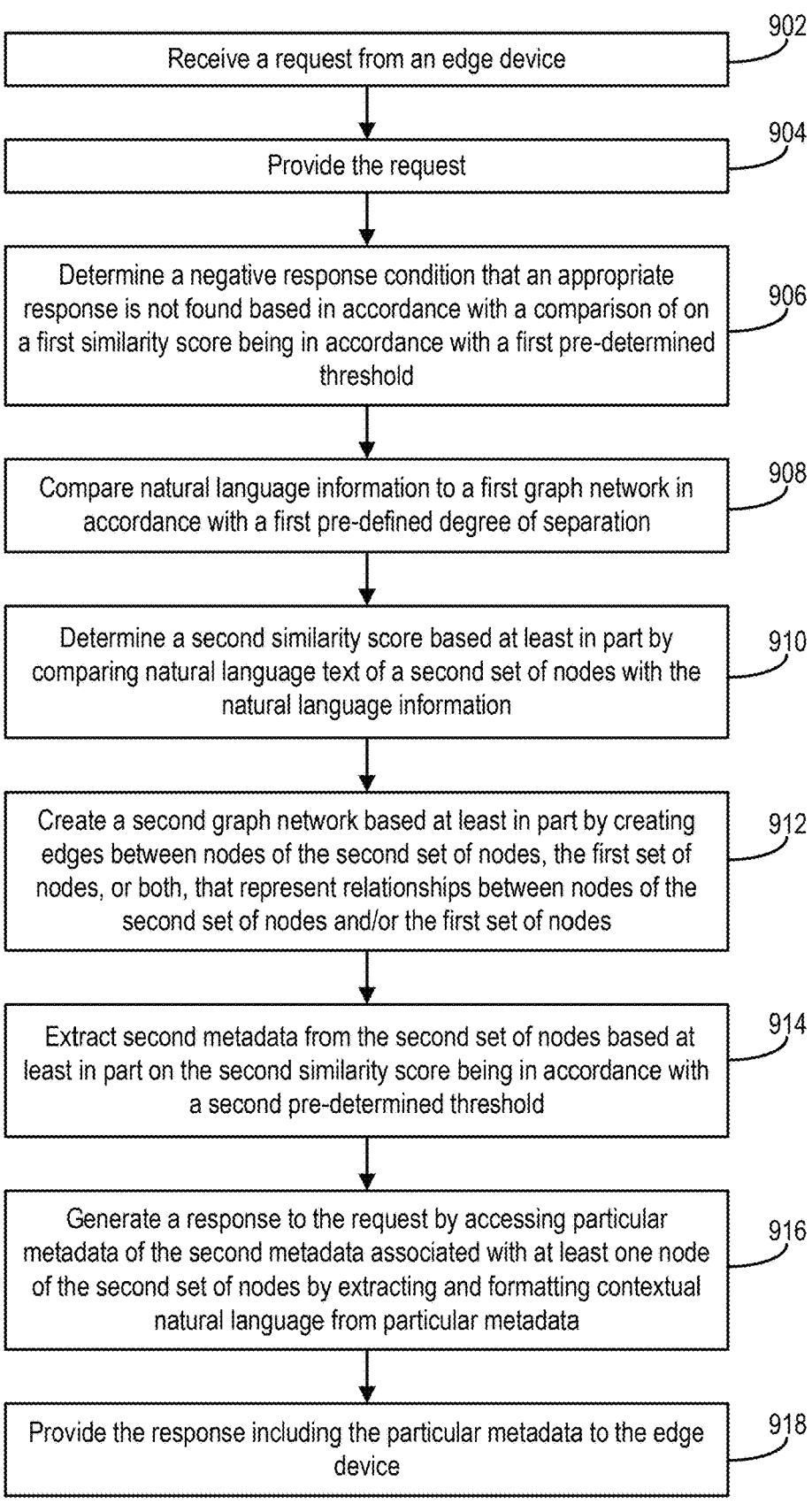

902
Receive a request from an edge device

904
Provide the request

906
Determine a negative response condition that an appropriate response is not found based in accordance with a comparison of on a first similarity score being in accordance with a first pre-determined threshold 908
Compare natural language information to a first graph network in accordance with a first pre-defined degree of separation 910
Determine a second similarity score based at least in part by comparing natural language text of a second set of nodes with the natural language information 912
Create a second graph network based at least in part by creating edges between nodes of the second set of nodes, the first set of nodes, or both, that represent relationships between nodes of the second set of nodes and/or the first set of nodes 914
Extract second metadata from the second set of nodes based at least in part on the second similarity score being in accordance with a second pre-determined threshold 916
Generate a response to the request by accessing particular metadata of the second metadata associated with at least one node of the second set of nodes by extracting and formatting contextual natural language from particular metadata 918
Provide the response including the particular metadata to the edge device

AUGMENTATION OF GRAPH NETWORKS

BACKGROUND

Conventional question and answer systems, such as chat-bots, operate by referencing a repository of data and retrieving pre-defined information in response to user queries. These systems are somewhat effective at providing direct answers to pre-defined questions where the requested information exists within the data stores. Because the data repositories are generally organized in a flat or segmented manner without meaningful interconnections between entries, the system cannot infer or construct answers that depend on contextual, relational, or multi-step reasoning.

BRIEF SUMMARY

Techniques are provided for augmenting graph networks with extended degrees of freedom. Various embodiments are described herein, including methods, systems, non-transitory computer-readable storage media storing programs, code, or instructions executable by one or more processors, and the like.

According to various embodiments, a computer-implemented method comprises receiving a request from an edge device; providing, to a generative model in a prompt, the request; determining, based at least in part on an output of the generative model, a negative response condition in accordance with a comparison of a first similarity score with a first pre-determined threshold; comparing natural language information to a first graph network in accordance with a first pre-defined degree of separation, the first graph network comprising a first set of nodes that represent a plurality of entities and a first set of edges that represent relationships between the plurality of entities and the natural language information comprising at least one of a portion of the output or a portion of the request; determining a second similarity score based at least in part by comparing natural language text of a second set of nodes with the natural language information, the second set of nodes not occurring in the first graph network and the second similarity score representing similarity between at least the natural language information and first metadata associated with the second set of nodes; extracting second metadata from the second set of nodes based at least in part on the second similarity score being in accordance with a second pre-determined threshold, the second set of nodes being within a second pre-defined degree of separation different from the first pre-defined degree of separation; creating a second graph network based at least in part by creating edges between nodes of the second set of nodes, the first set of nodes, or both, that represent relationships between nodes of the second set of nodes and/or the first set of nodes, the second graph network being different than the first graph network; generating a response to the request by accessing particular metadata of the second metadata associated with at least one node of the second set of nodes by extracting and formatting contextual natural language from the particular metadata; and providing the response including the particular metadata to the edge device.

According to various embodiments, the computer-implemented method further comprises deploying the second graph network to a cloud environment that hosts the first graph network or the second graph network; and updating one or more skills associated with a chat bot that received the request based at least in part on the second graph network.

According to various embodiments, the computer-implemented method is provided where the first pre-defined degree of separation includes two or fewer edges, and the second pre-defined degree of separation includes at least one edge more than the first pre-defined degree of separation, and the negative response condition indicates a lack of a response or a non-response condition.

According to various embodiments, the computer-implemented method is provided where the request is received by a first chat bot, further comprising creating a new skill for the first chat bot based at least in part on the second metadata or the response; and storing the new skill in a cloud environment for retrieval by a second chat bot different from the first chat bot.

According to various embodiments, the computer-implemented method further comprises extracting portions of information from the second metadata; transforming the portions of information into plain English summary with a context associated with the request; and inserting one or more hyperlinks into the plain English summary in accordance with documents associated with the second metadata, the response comprising the plain English summary, the one or more hyperlinks, or both.

According to various embodiments, the computer-implemented method further comprises creating a production generative model by updating the generative model, the second graph network, the second metadata, the response, or combinations thereof, as unlabeled training data; and deploying the production generative model in a cloud environment.

According to various embodiments, the computer-implemented method further comprises receiving, from the edge device, a second request associated with the response, the second request associated with controlling an asset associated with a first entity of the plurality of entities and the response; controlling the asset associated with the first entity to transfer to a second entity of the plurality of entities; and updating the first graph network or the second graph network in accordance with the transfer.

According to various embodiments, a computing device comprises one or more processors; and one or more memories storing computer-executable instructions that, when executed by the one or more processors, causes the one or more processors to receive a request from an edge device; provide, to a generative model in a prompt, the request; determine, based at least in part on an output of the generative model, a negative response condition in accordance with a comparison of a first similarity score with a first pre-determined threshold; compare natural language information to a first graph network in accordance with a first pre-defined degree of separation, the first graph network comprising a first set of nodes that represent a plurality of entities and a first set of edges that represent relationships between the plurality of entities and the natural language information comprising at least one of a portion of the output or a portion of the request; determine a second similarity score based at least in part by comparing natural language text of a second set of nodes with the natural language information, the second set of nodes not occurring in the first graph network and the second similarity score representing similarity between at least the natural language information and first metadata associated with the second set of nodes; extract second metadata from the second set of nodes based at least in part on the second similarity score being in accordance with a second pre-determined threshold, the second set of nodes being within a second pre-defined degree of separation different from the first pre-defined degree of separation; create a second graph network based at least in part by creating edges between nodes of the second set of nodes, the first set of nodes, or both, that represent relationships between nodes of the second set of nodes and/or the first set of nodes, the second graph network being different than the first graph network; generate a response to the request by accessing particular metadata of the second metadata associated with at least one node of the second set of nodes by extracting and formatting contextual natural language from the particular metadata; and provide the response including the particular metadata to the edge device.

According to various embodiments, the instructions further cause the processor to deploy the second graph network to a cloud environment that hosts the first graph network or the second graph network; and update one or more skills associated with a chat bot that received the request based at least in part on the second graph network.

According to various embodiments, the first pre-defined degree of separation includes two or fewer edges, and the second pre-defined degree of separation includes at least one edge more than the first pre-defined degree of separation, and the negative response condition indicates a lack of a response or a non-response condition.

According to various embodiments, the request is received by a first chat bot, and the instructions of a computing device further cause the processor to create a new skill for the first chat bot based at least in part on the second metadata or the response; and store the new skill in a cloud environment for retrieval by a second chat bot different from the first chat bot.

According to various embodiments, the instructions further cause the processor to extract portions of information from the second metadata; transform the portions of information into plain English summary with a context associated with the request; and insert one or more hyperlinks into the plain English summary in accordance with documents associated with the second metadata, the response comprising the plain English summary, the one or more hyperlinks, or both.

According to various embodiments, the instructions of a computing device further cause the processor to create a production generative model by updating the generative model, the second graph network, the second metadata, the response, or combinations thereof, as unlabeled training data; and deploy the production generative model in a cloud environment.

According to various embodiments, the instructions further cause the processor to receive, from the edge device, a second request associated with the response, the second request associated with controlling an asset associated with a first entity of the plurality of entities and the response; control the asset associated with the first entity to transfer to a second entity of the plurality of entities; and update the first graph network or the second graph network in accordance with the transfer.

According to various embodiments, a non-transitory computer-readable storage medium stores computer-executable instructions that, when executed with one or more processors of a computing device, causes the one or more processors to receive a request from an edge device; provide, to a generative model in a prompt, the request; determine, based at least in part on an output of the generative model, a negative response condition in accordance with a comparison of a first similarity score with a first pre-determined threshold; compare natural language information to a first graph network in accordance with a first pre-defined degree of separation, the first graph network comprising a first set of nodes that represent a plurality of entities and a first set of edges that represent relationships between the plurality of entities and the natural language information comprising at least one of a portion of the output or a portion of the request; determine a second similarity score based at least in part by comparing natural language text of a second set of nodes with the natural language information, the second set of nodes not occurring in the first graph network and the second similarity score representing similarity between at least the natural language information and first metadata associated with the second set of nodes; extract second metadata from the second set of nodes based at least in part on the second similarity score being in accordance with a second pre-determined threshold, the second set of nodes being within a second pre-defined degree of separation different from the first pre-defined degree of separation; create a second graph network based at least in part by creating edges between nodes of the second set of nodes, the first set of nodes, or both, that represent relationships between nodes of the second set of nodes and/or the first set of nodes, the second graph network being different than the first graph network; generate a response to the request by accessing particular metadata of the second metadata associated with at least one node of the second set of nodes by extracting and formatting contextual natural language from the particular metadata; and provide the response including the particular metadata to the edge device.

According to various embodiments, the instructions further cause the processor to deploy the second graph network to a cloud environment that hosts the first graph network or the second graph network; and update one or more skills associated with a chat bot that received the request based at least in part on the second graph network.

According to various embodiments, the first pre-defined degree of separation includes two or fewer edges, and the second pre-defined degree of separation includes at least one edge more than the first pre-defined degree of separation, and the negative response condition indicates a lack of a response or a non-response condition.

According to various embodiments, the request is received by a first chat bot, and the instructions further cause the processor to create a new skill for the first chat bot based at least in part on the second metadata or the response; and store the new skill in a cloud environment for retrieval by a second chat bot different from the first chat bot.

According to various embodiments, the instructions cause the processor to extract portions of information from the second metadata; transform the portions of information into plain English summary with a context associated with the request; and insert one or more hyperlinks into the plain English summary in accordance with documents associated with the second metadata, the response comprising the plain English summary, the one or more hyperlinks, or both.

According to various embodiments, the instructions further cause the processor to create a production generative model by updating the generative model, the second graph network, the second metadata, the response, or combinations thereof, as unlabeled training data; and deploy the production generative model in a cloud environment.

At least one embodiment is directed to a computing device comprising one or more processors and one or more memories storing computer-executable instructions that, when executed by the one or more processors, cause the one or more processors to perform the method(s) disclosed herein.

At least one embodiment is directed to a non-transitory computer-readable storage medium storing computer-executable instructions that, when executed with one or more processors of a computing device, causes the one or more processors to perform the method(s) disclosed herein.

BRIEF DESCRIPTION OF THE DRAWINGS

Various embodiments in accordance with the present disclosure will be described with reference to the drawings, in which:

FIG. 1 is a simplified diagram of an example method for augmenting a graph network with extended nodes, according to certain embodiments.

FIG. 4 is a simplified diagram of example method for generating a response using a second graph network, according to certain embodiments.

FIG. 8 is a simplified diagram of an example method for staged undefined object heterogeneity optimization, according to certain embodiments.

FIG. 9 is a simplified diagram of an example method for staged undefined object heterogeneity optimization, according to certain embodiments.

DETAILED DESCRIPTION

Figure 2:
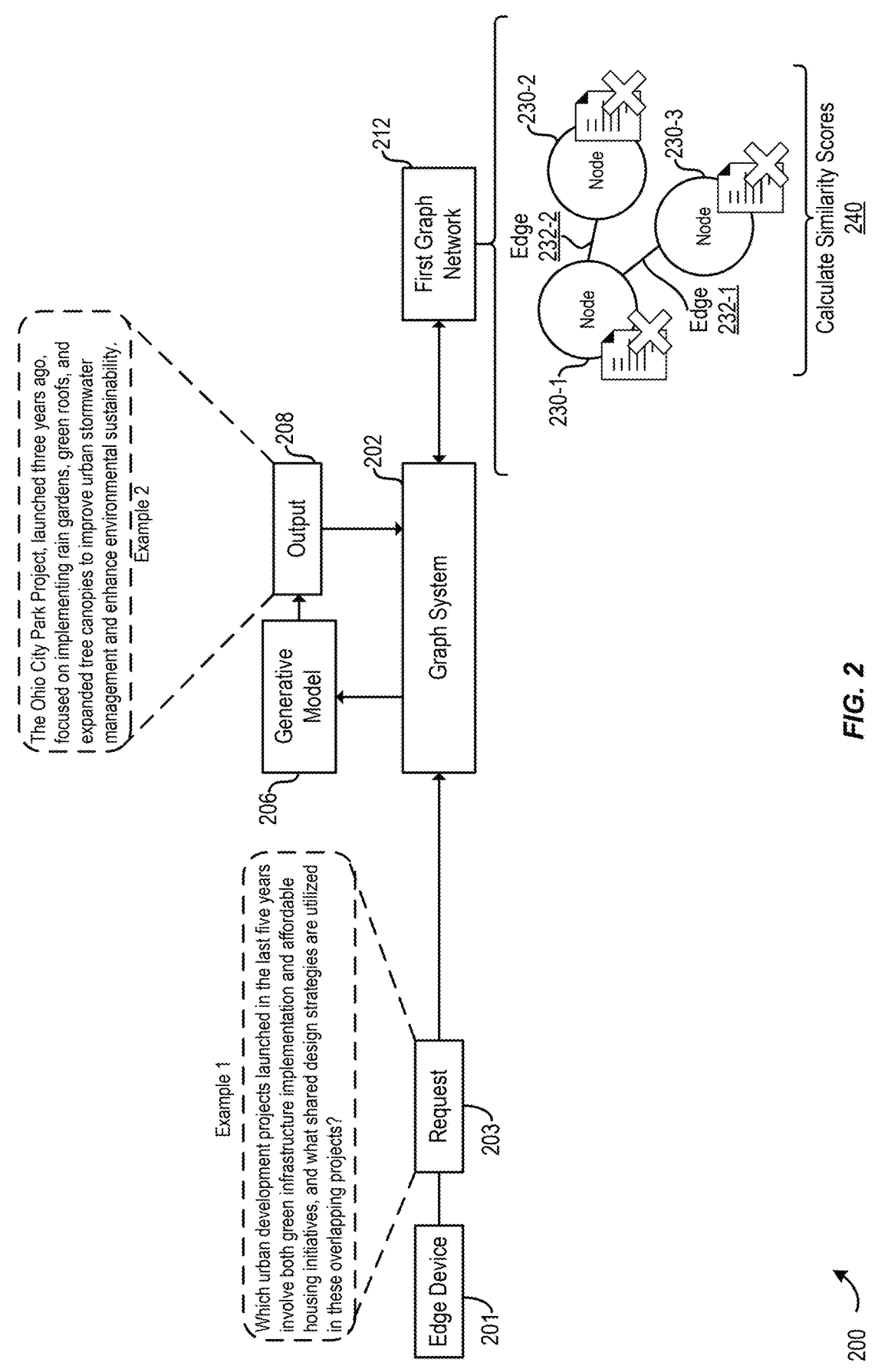
FIG. 2 is a simplified block diagram for generating a negative response condition by a graph system, according to certain embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Many chatbots rely on pre-defined files (e.g., JSON files) or databases to generate responses to user inquiries. These files, which may include structured datasets, frequently asked questions, or scripted dialogues, are created to cover anticipated topics and provide replies to common questions. For example, an organization specific chatbot might use a spreadsheet listing product details, shipping policies, and troubleshooting steps, allowing it to retrieve and present this information when prompted. However, when a user's question falls outside the scope of the pre-defined files, the chatbot's ability to respond appropriately is limited. In such cases, these conventional systems may default to pre-defined rejection responses (e.g., "I am sorry, I do not understand") or generic and unhelpful responses that do not answer the question from the user.

Some chatbots use generative models (e.g., machine learning language models (MLMs)), which are capable of producing unique responses based on patterns learned from large volumes of training data. When a query cannot be addressed by pre-defined files, the chatbot may pass the question to the generative model, which attempts to construct an answer using its internal representation of language and knowledge. For instance, if a user asks an unusual question about a product feature not explicitly covered in the chatbot's database, such as asking a question that needs results from two or more files that are not pre-correlated, the generative model might generate a plausible explanation or suggestion but may not provide the most accurate and precise response.

Using generative models often fall short when it comes to providing organization-specific information. Many generative models (e.g., foundation models) are pre-trained on large, publicly available datasets, (e.g., internet text, encyclopedias, or general knowledge bases) rather than proprietary data or internal documentation unique to a particular organization (e.g., classified, confidential, etc.). As a result, when a user poses a question that relies on internal company policies, confidential procedures or documents, or specific historical data, the generative model is likely to produce an answer that is either too generic (e.g., based on public information), out of date, or entirely inaccurate (e.g., a hallucination). For example, if a user asks a chatbot about the organization's latest protocol or the status of an internal project, the generative model may revert to general statements about compliance or project management without addressing the specifics needed to answer the user's query Graph networks are data structures that organize information by linking individual elements, known as nodes, through connections referred to as edges. Each node can represent a discrete item, such as a text passage, image, or dataset, while edges capture the various relationships between these items, including references, similarities, or associations. This allows for a flexible and intuitive mapping of information, where the connections between items can be made for future reference. For example, in a collection of scientific articles, each article might be a node connected by edges to other articles that cite it, share key concepts, or address related research questions. Graph networks make it possible to navigate complex sets of unsorted data, explore how ideas develop across different sources, and answer nuanced queries that rely on understanding the relationships among diverse pieces of information that are frequently updated.

Degrees of separation in a graph network describe how many steps, or edges, are needed to connect one node to another. When two nodes are directly linked, the two nodes are one degree of separation apart. If a node must be reached by passing through another node, that connection is two degrees of separation, and so on for further indirect links. In a network of related documents where two documents that reference each other are one degree apart, while a third document connected only through a mutual reference is two degrees away from the first.

Graph networks can be augmented in a staged manner by lowering a similarity score threshold in steps if an appropriate response is not found within a current topology having a pre-determined degree of separation between nodes. When broader or less exact matches are allowed, new edges may form between nodes that were previously considered unrelated and existing nodes. This method can also bring previously unconnected nodes into the graph network, forming new clusters and changing the overall topology to better reflect the true relationships within the data. By adjusting these similarity scores in a staged method, latent associations can be identified to improve the accuracy of search results, and generate a more precise and interconnected graph that may more adequately answer the user's query with up-to-date information.

Graph network topologies can be generated dynamically in response to a user's query by first assembling a core set of nodes and edges (e.g., a first graph network) that are most relevant to the question. This graph network may be limited to directly connected entities or those highly likely to provide useful information, which allows for rapid construction and efficient use of computational resources. If this initial graph network does not yield a sufficient answer (e.g., answer not found, answer is unrelated to the request, etc.), determined by the system, such as when no nodes or edges match the user's natural language query, the system can then selectively expand the network. For example, the user's query may have a question, "What green initiatives are related to Project XYZ?" and the system may return the answer, "Data not found" if no data is available or "Green initiatives are initiatives that lower a carbon footprint on average". This expansion may involve adding new nodes and edges by lowering similarity score thresholds or incorporating broader contextual data, ensuring that the graph network only grows when appropriate responses are not found.

According to embodiments herein, the system may avoid ongoing overhead of maintaining a large, fully loaded graph network in memory, instead adapting its complexity in response to the user's needs. This is particularly effective for large or complex unsorted datasets that are updated frequently, where limiting the initial graph network preserves both processing power and memory. When a more complicated question arises, the graph network can be broadened to include more distant and/or less directly related nodes. In this way, the graph network becomes more detailed and interconnected only when the situation requires, which maintains resource efficiency while still allowing the system to provide accurate and thorough answers. For example, a question such as, "What green initiatives in the past five months have been completed for organizations that have a net neutral carbon footprint" may need information regarding green initiatives in the past five months, organizations associated with those green initiatives, and which of those organizations have had a net neutral carbon footprint during any time period. If the generative model was trained before this time period and the initial graph network was constructed using edges that primarily represent relationships between organizations with a history of green initiatives, the resulting network may lack any nodes or edges that capture information about whether those organizations have achieved a net neutral carbon footprint. In this situation, when a user submits a request concerning net neutral status, the system can expand the graph network by incorporating new nodes that represent organizations' carbon footprint data and by creating edges that link these new nodes to existing ones. Adding these nodes and relationships, the graph network may be updated to reflect more current and relevant connections to enable the system to respond to queries about both historical green initiatives and present-day net neutral carbon footprints.

By way of a non-limiting example, a user may submit a complex query to a chatbot, seeking the most recent sustainability ratings for several organizations and a comparison of their carbon neutrality achievements over the past year. When the chatbot cannot answer from its own database of answers, the chatbot request the system forward the query to a generative model, which, having been trained several years prior, may lack access to current sustainability reports and carbon neutrality data. The generative model recognizes that it cannot provide an adequate response and signals this deficiency to the system. In response, the system may decide to augment an existing graph network that has relevant information that may be generally unsorted by selectively adding new nodes representing updated organizational data and new edges that link these nodes to relevant existing entities, focusing only on a minimum amount of additions needed to address the query. This expansion reduces processing power and memory needs, as the graph network is not broadly rebuilt, but is instead incrementally updated in response to a demand. The system may extract the necessary information from the augmented graph network, generate a plain English summary that answers the user's question, and includes hyperlinks to supporting documents. In some examples, the chatbot is trained with a new skill based on this interaction, enabling it to handle similar queries directly in the future, which further reduces a need for frequent graph network expansion or costly retraining of the generative model. This process provides accurate responses and allows the graph network to compensate for outdated or incomplete generative model training in real time.

According to various embodiments, systems herein dynamically process and retrieve natural language information in a networked environment (e.g., cloud environment). Examples herein adaptively build and modify graph networks in response to user requests, specifically by comparing similarity scores, augmenting graph structures, and extracting and formatting metadata to answer specific queries. Systems herein actively generate a first graph network, assess the sufficiency of its results using similarity scores and pre-defined degrees of separation, and as mentioned above, an adequate response can be retrieved, a second graph network that incorporates additional nodes and edges may be created. This second network is formed based on refined similarity criteria and expanded degrees of separation, enabling the system to discover and contextualize previously unavailable or less obvious relationships among entities represented as nodes.

As described above, conventional chatbot systems rely on pre-defined files, structured datasets, and/or generative models to answer user questions. The conventional methods can be effective for straightforward queries that directly match internal data or training, they often fail when users pose questions involving organization-specific information, recently updated data, or need synthesizing insights from multiple sources. Generative models are commonly trained on general-purpose publicly available data and are not continuously updated with proprietary documents or real-time organizational changes. These conventional systems may provide generic, outdated, or incomplete answers, defaulting to unhelpful responses when confronted with nuanced or complex requests. These deficiencies are particularly visible in environments where data is frequently updated or where context-sensitive, multi-step reasoning is needed to deliver accurate, up-to-date answers.

Systems herein may remedy these deficiencies by using graph networks that may be generated and augmented in real time based on user queries and evolving data. Rather than relying solely on static datasets or processing intensive retraining generative models, the system begins with an existing graph network of nodes and edges based on previously asked queries. If the graph network does not yield a sufficient response, the system may expand the network by lowering similarity thresholds and/or introducing new nodes and edges so that only the minimal necessary information is processed which limits a processing and memory footprint.

This staged augmentation may aid in identifying latent relationships and incorporates the latest data without needing retraining of the generative models.

Additionally, the system can extract and format contextual answers, update chatbot skills based on new insights, and deploy augmented graph networks to other environments for faster future responses. The graph network expansion provides that only relevant portions of the data are processed and loaded, rather than needing the full graph network to be maintained at all times, which is generally impractical when working with ever expanding datasets that are updated in real-time on a day-by-day basis. Further, by selectively assembling and augmenting graph networks in real time, the system provides an improvement to data processing, supports more accurate and relevant responses, and enhances the functionality of computer and/or cloud systems in handling complex, context-sensitive queries without unduly burdening the processor or memory.

In various examples, once the second graph network is created, it can be deployed to other computing environments or systems serving as a new "base" graph network to facilitate faster and more efficient analysis for future queries or related applications. Because the second graph network incorporates expanded nodes and edges that represent newly discovered relationships, it serves as a richer and more interconnected repository of information. By transferring or sharing this refined network with additional edge devices, cloud-based platforms, or systems, organizations can use the enhanced graph topology to accelerate data retrieval and contextual analysis. For example, a second graph network that includes contextual metadata and broader linkages between entities can be integrated into a text retrieval platform, enabling users to quickly surface relevant information without reconstructing the first network or the second network from scratch. Other systems may use the deployed graph as a pre-processed resource, allowing for immediate access to direct and indirect relationships that were previously unavailable. This deployment not only reduces the computational burden associated with building new networks for each request, but also improves response times and the quality of answers provided to users in different environments. By sharing or replicating the second graph network, organizations ensure that subsequent queries benefit from the advanced insights and connections already established, supporting scalable, and adaptive information processing across a variety of environments.

FIG. 1 is a simplified diagram of an example method 100 for augmenting a graph network with extended nodes, according to certain embodiments. Augmenting the graph network with additional nodes may reduce or eliminate a need to continuously train generative models based on organization specific data that is updated continuously (e.g., in real-time, once a day, a few times a day, etc.). In this manner, a user requesting assistance from a chatbot can get up to date and accurate responses without having to continuously train a generative model every time new data is inducted into the system.

At 130, the method 100 may include receiving a request 103 from an edge device 101. For example, a graph system 102 may include a chatbot system that interacts with a user, via the edge device 101, to receive the request 103. The request 103 can include a natural language utterance or suitable equivalent from the user that desires a specific piece of information. The request 103 may be provided in a prompt to a generative model (e.g., a machine learning model (MLM) and an output from the generative model may be provided to the graph system 102 for analysis.

At 132, the method 100 may include determining that an appropriate response is not found. For example, the output from the generative model may not be adequate (e.g., due to incomplete training, hallucinations, etc.) or the generative model may not be able to provide the correct response due to not having knowledge of proprietary databases that are organization specific. In some examples, the output from the generative model may be determined to be inadequate by feedback from the user that supplied the request 103. Based on determining the response is not appropriate, the graph system 102 may take further action in order to attempt generate an appropriate response by querying for the appropriate information based on a pre-defined graph network that includes a topology of nodes and edges. The nodes can represent entities such as contextual data instances (e.g., documents) and the edges can represent relationships between the nodes.

By way of a non-limiting example, a first digital specification manual (e.g., first node) on a first type of sensors may include an edge to a second specification manual associated with a second type of sensors. The edge in this instance may exist because both manuals are related to sensors. The graph network may have a pre-defined degree of separation between nodes defined by how many edges are serially connected to one another. For example, if each node in the graph network includes a maximum of two edges from any other suitable node, then the pre-defined degree of separation in this example would be two. Since new data is being added to the database that the graph network is generated on, new relationships (edges) may be made to new documents (nodes) that are added.

At 134, the method 100 may include calculating a similarity score according to a pre-defined degree of separation. By way of a non-limiting example, natural language information in the request 103 may be used in calculating the similarity score between existing natural language information in the documents. If none of the existing nodes or edges in the graph network meet a threshold (e.g., a 95% match), then the graph system 102 may determine that a new graph network needs to be generated by augmenting the graph network with more loosely linked edges (e.g., lowering a similarity score threshold) and/or generating a new graph network with new data that was added to the graph system 102 by augmenting the first graph network.

At 136, the method 100 may include creating a second graph network. By way of example, the similarity score threshold for the natural language information may be lowered and/or additional nodes may be searched. If a match is found in a new node based on the natural language information in the request 103, a new edge may be created from the newly created node to an existing node. The second graph network may be created based at least in part by creating new edges between the nodes of the first graph network and new nodes uncovered in the analysis to aid in future responses.

At 138, the method 100 may cause a response to be provided to the edge device. For example, metadata associated with the new node in the second graph network may be extracted and put into a proper form either by the graph system 102 and/or by providing the new information in a prompt to the generative model to format the response properly so that the user that provided the request 103 can understand the response more readily.

FIG. 2 is a simplified block diagram for generating a negative response condition by a graph system, according to certain embodiments. By way of a non-limiting example, an edge device 201 (e.g., a smart phone, computer, etc.) may submit a request 203 to a graph system 202 which may include an interactive agent (e.g., a chatbot) that is programmed to provide responses to requests. The request 203 can include natural language information including, without limitation, a natural language utterance, text, statements, questions, or suitable equivalents. For example, the request 203 can include the question as shown in example 1, "Which urban development projects launched in the last five years involve both green infrastructure implementation and affordable housing initiatives, and what shared design strategies are utilized in these overlapping projects?". The natural language utterance can be an audio utterance (e.g., speech), text (e.g., typed or brail), machine language (e.g., provided in machine code or by a machine), or signed (e.g., American sign language, British sign language, etc.). The request 203 may be provided to the graph system 202 which may provide at least a portion of the request 203 to a generative model 206.

The generative model 206 may interact indirectly, by way of the graph system 202, or directly with edge devices 201 to generate customized responses to the requests 203. For example, the graph system 202 may receive the request 203 from the edge device 201 and incorporate the request 203 into a prompt that is provided to the generative model 206. The generative model 206 may process the prompt to generate an output 208 that is specific to the request 203. However, the output 208 produced by the generative model 206 may not always be adequate for answering the request 203. Limitations can arise due to the nature of the generative model's 206 training, which may rely on publicly available datasets that do not include proprietary databases or organization-specific data, or data that is updated frequently (e.g., every day). As a result, the generative model 206 may lack access to confidential documents, internal protocols, and/or specialized information that is not part of its training. Even when suitable equivalents exist in public data, the generative model 206 may not be able to fully replicate the nuance, accuracy, and/or context needed for organization-specific requests 203. For example, the output 208 to the question, "Which urban development projects launched in the last five years involve both green infrastructure implementation and affordable housing initiatives, and what shared design strategies are utilized in these overlapping projects?" may not account for the nuanced context of "what shared design strategies are utilized in these overlapping projects?" As shown in example 2, "The Ohio City Park Project, launched three years ago, focused on implementing rain gardens, green roofs, and expanded tree canopies to improve urban stormwater management and enhance environmental sustainability." This example output 208 fails to adequately address affordable housing initiatives and shared design strategies.

The edge device 201 may include, but is not limited to, desktop or laptop computers, tablets, smartphones, point-of-sale terminals, industrial sensors, and/or specialized hardware deployed at or near the source of data generation or user interaction. The edge device 201 may be configured to support network communication protocols to transmit natural language queries to a cloud environment hosting a graph network. In various embodiments, the edge device 201 may also include a user interface for displaying answers to the request, receiving input, and/or displaying an application interfaceable with the graph network hosted in the cloud environment.

As mentioned above, the graph network may be hosted on one or more cloud-based servers (hosting the cloud environment). Deployment in the cloud environment enables the graph network to be updated, augmented, and/or queried periodically or in real time as new data is uploaded and/or added or as user queries are received from the edge device 201.

The graph system 202 may determine that the output 208 includes a negative response condition in accordance with a comparison to a first graph network 212. The graph system 202 may construct the first graph network 212 by crawling a set of databases that include disparate entities (e.g., documents) by extracting each entity as a distinct node within the first graph network 212. As the graph system 202 accesses each database, the graph system 202 creates nodes 230 for relevant entities, attaching metadata such as, but not limited to, context, document identifiers, subject, text strings, and/or keywords to describe and differentiate each node. Once the nodes 230 are established, the graph system 202 may analyze content and metadata of the nodes to identify relationships among them. By comparing elements such as, without limitation, shared keywords, references, and/or thematic similarities, the graph system 202 may determine where overlap exists and creates edges 232 between nodes 230 to indicate these connections thus forming the first graph network 212.

The negative response condition may be determined by a first similarity score associated with metadata (e.g., text) of nodes 230 and/or edges 232 within a pre-determined threshold. If the output 208 does not match metadata associated with the nodes 230 and/or edges, the negative response condition may be generated indicating that an adequate answer could not be found within the first graph network 212. For example, if the edge device 201 requests, "the latest internal safety protocol for laboratory equipment," and the output 208 generated by the generative model 206 is a general description of laboratory safety practices rather than specific, up-to-date internal procedures, the similarity score 240 between the output 208 and the metadata of nodes 230 representing those protocols may fall below the pre-determined threshold. Another example could involve a request 203 about "quarterly results for a particular green initiative," where the generative model's 206 output references unrelated research activities or outdated green initiative figures. In both of these examples, a lack of sufficient overlap between the request 203 and/or output 208 and the node 230 metadata leads the graph system 202 to identify the negative response condition.

As a result of the negative response condition, the graph system 202 may determine that the first graph network 212 should be augmented and/or replaced with a second graph network that may have the appropriate metadata that will not lead to a negative response condition. These additional processes are described with respect to FIGS. 3-7.

Figure 3:
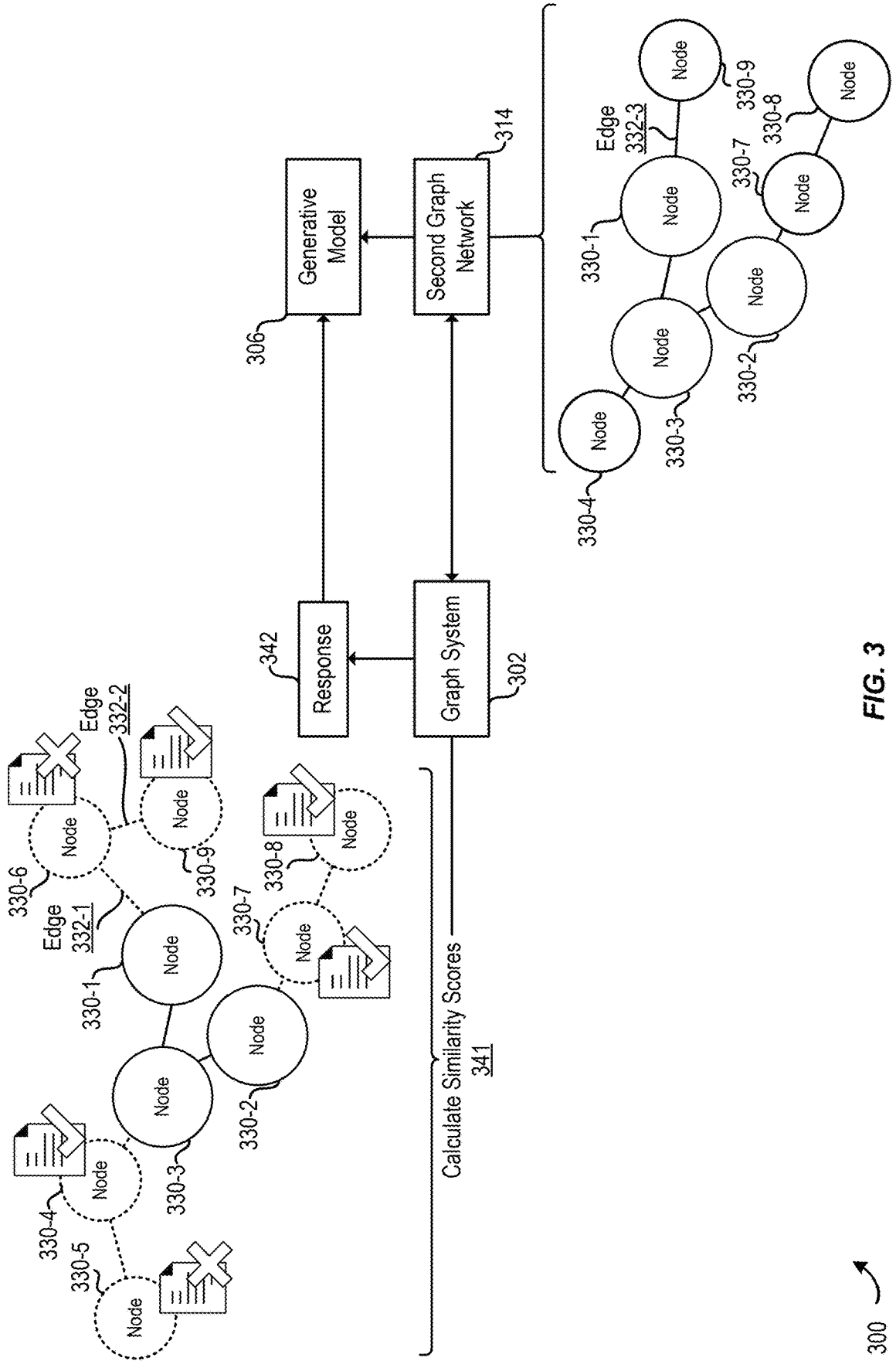
FIG. 3 is a simplified diagram of example method for generating a second graph network, according to certain embodiments.

FIG. 3 is a simplified diagram of example method for generating a second graph network, according to certain embodiments. As discussed in FIG. 2, a negative response condition may be generated when an adequate response cannot be made in response to a request from an edge device. In these instances, augmenting a first graph network can begin in response to the negative response condition, by user request, and/or automatically determined. For example, a graph system 302 (which is an example of the graph system 202 with respect to FIG. 2) may first identify areas within the first graph network (e.g., first graph network 212 with respect to FIG. 2) where relevant information exists and/or where connections between nodes 330 that are relevant are greater than a calculated average (or mean) with respect to all nodes 330 in the first graph network (e.g., a cluster). The graph system 302 may analyze the nodes 330 and the edges 332 in the first graph network to determine which terms can be expanded to augment the first graph network to include more nodes 330 and edges 332. The dashed lines represent nodes and edges that are candidates for being inducted into the first graph network to form a second graph network 314. Determining which nodes 330 and edges 332 are to be included is discussed in detail below.

In some examples, the graph system 302 may incorporate new data sources by crawling the set of databases that were used to create the first graph network, additional databases that were not used to create the first graph network, importing recently created metadata that was added after the first graph network was created, and/or integrating external information repositories (e.g., third party databases). Each newly identified entity may be compared to the metadata in the response 342 and, similar to the first graph network, may be compared to metadata within the nodes 330 using calculated similarity scores 341. In this example, nodes 330-4 and nodes 330-7 through 330-9 may be added to augment the first graph network as a new node, with corresponding metadata captured to describe its content (e.g., key phrases, author information, subject matter, or suitable equivalents) while nodes 330-5 and 330-6 may be discarded since these nodes 330 did not include metadata that met the similarity score threshold.

For example, the graph system 302 may evaluate the relationships between new and existing nodes 330 by comparing the metadata and the request. To increase the likelihood of forming meaningful connections, the similarity threshold for determining whether to create an edge 332 between nodes can be lowered. This adjustment means that nodes 330 sharing broader or less exact matches (e.g., synonyms, related concepts, and/or contextual equivalents) may now be linked even if their overlap was previously considered insufficient. Edges 332 may be created to represent these new or expanded relationships, which may connect nodes 330 directly or through intermediate nodes (as in node 330-9 begin connected directly to node 330-1 via edge 332-3, rather than directly through 330-6), depending on a degree of similarity and/or contextual relevance.

In addition to forming connections based on direct and/or indirect similarities, the graph system 302 may also search for suitable equivalents within the data, (e.g., documents that address comparable topics or fulfill similar functions even if they use different terminology). By considering these equivalents, the graph system 302 can capture a broader range of relevant associations and provide context for future requests that may be similar. In this way, a second graph network 314 may be made by augmenting the first graph network. In some examples, an entirely new graph network may be generated that is not based on the first graph network.

In various embodiments, the graph system 302 may aggregate the relevant metadata with met the similarity score from the appropriate nodes 330 and provide them, in a proper format, into a response 342 (discussed in more detail with respect to FIG. 4). In addition, or alternatively, the response 342 may be provided in a prompt to a generative model 306 to be appended and/or formatted into a response to the edge device. In various examples, the second graph network 314 may be trained on the second graph network 314 (discussed in more detail with respect to FIG. 5).

Similarity scores between natural language information (e.g., text, audio, visual, etc.) herein may be calculated by performing a keyword and metadata comparison between the user's natural language information (which may be transcribed automatically if not in text form) and the contents of nodes within the graph network. When a user submits a request such as, "Show me the latest compliance policies for work in region A," the graph system 302 may first parse the request to extract key terms (e.g., "compliance," "policies," and "region A"). For each node 330 in the graph network, which may represent policy documents in this example, the graph system 302 may analyze a document title, summary, and/or tagged metadata fields. The similarity score may then be computed as a ratio of overlapping keywords between the request and metadata in the node 330 to a total number of keywords in the request. For example, if a policy node contains the keywords "compliance," "region A," and "guidelines," and three out of four query terms match, the similarity score for that node would be 0.75. This score is compared to a predefined threshold (e.g., 0.7), and nodes meeting or exceeding the threshold are marked as relevant candidates for data extraction or inclusion in the response.

In another example, the graph system 302 may use semantic embeddings and cosine similarity score to calculate how closely the natural language information in the request matches the textual content of the nodes 330. After receiving a query such as, "Which research papers discuss engineering applications for green initiatives in region B?" the graph system 302 may encodes both the request and each document node's 330 full text into a vector representation using a pre-trained language model (e.g., BERT or a similar transformer-based model). The cosine similarity score between the request vector and each node vector may then be calculated, which measures an angle between the two vectors and provides a value between zero and one, with one indicating identical semantic content. For instance, if the request vector and a node's vector yield a cosine similarity score of 0.92, this indicates a strong semantic match. The graph system 302 can rank nodes by their similarity scores, filter out those below a set threshold (such as 0.8), and proceed to form new edges 332 or expand the graph network 302 with nodes 330 that are highly relevant to the intent of the request.

In another example, a hybrid method may be used that combines a contextual similarity score with graph structure analysis. For example, an edge device submits a request, "Find all recent collaborations between Department X and Department Y on sustainability projects." The system first identifies nodes 330 representing projects, departments, and collaboration records. The graph system 302 may then calculate respective contextual similarity scores for each node 330 by comparing the project description and associated metadata to the request, using either keyword overlap or semantic embeddings (as described above). The graph system 302 may examine the topology of the graph network 302, checking for edges that connect Department X and Department Y to the same project node, and further checks if the project node has a timestamp within the "recent" time window specified. The similarity score for each candidate is calculated as a weighted sum of the contextual similarity score and the topological closeness (e.g., direct connection of edges to existing nodes 330). For example, a project with the contextual similarity score of 0.85 and a direct edge formed within the past six months may receive a composite similarity score of 0.92, qualifying the node 330 for inclusion in the response 342.

FIG. 4 is a simplified diagram of example method for generating a response using a second graph network 414, according to certain embodiments. As discussed with respect to FIG. 3, the second graph network 414 with additional nodes and edges may be generated to provide a broader range of coverage of responses in response to a negative response condition being detected. By way of a non-limiting example, an edge device 401 (which is an example of edge device 201 with respect to FIG. 2) may submit a request 403 that includes natural language information. As depicted in example 1 the natural language information could be "Which urban development projects launched in the last five years involve both green infrastructure implementation and affordable housing initiatives, and what shared design strategies are utilized in these overlapping projects?" The graph system 402, in this example, may use the second graph network 414 to generate an appropriate response 442. For example, the response 442 may be "The Green Haven Residences project, launched four years ago, combines affordable housing units with permeable pavements, bio-swales, and rooftop gardens, utilizing shared design strategies like sustainable materials and co-located green spaces to maximize community and environmental benefits." which is an adequate plain English summary in accordance with documents associated with the question in example 1 and covers all aspects of the question. To generate this response 442, portions of information from metadata associated with the new nodes added in the second graph network 414 may be extracted and transformed into a plain English summary with a context associated with the request 403.

In various embodiments, the response 442 may include interactable interface elements 472 (e.g., hyperlinks or suitable equivalents) that the user of the edge device 401 can click on to see a source of the information in the response 442. For example, the user may interact with the response 442 to retrieve documents associated with the response and/or may request additional information in which the graph system 402 would retrieve other nodes connected by edges associated with the response.

Figure 5:
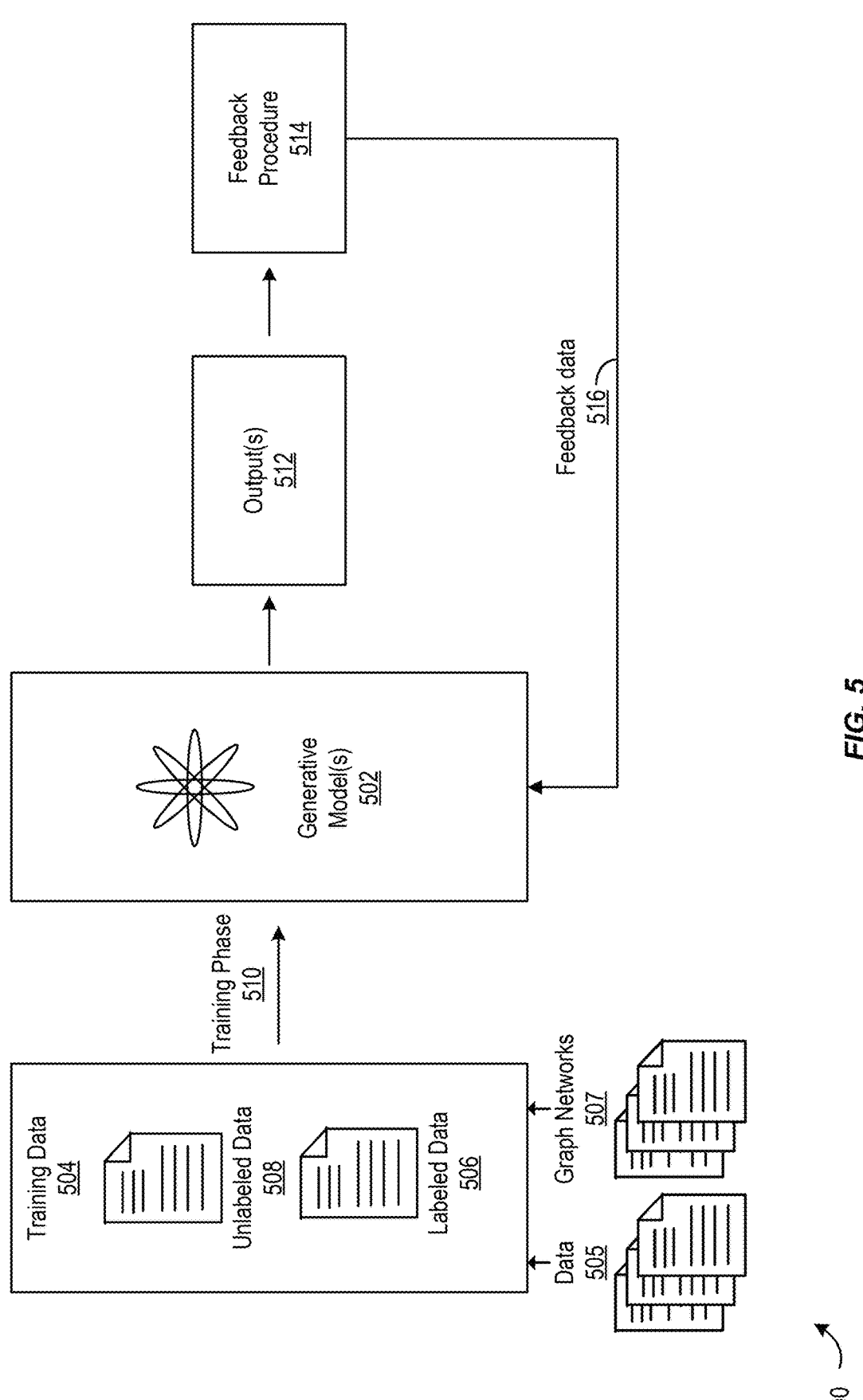
FIG. 5 is a simplified diagram of example of training a generative model based on feedback procedure as a result of generating a second graph network, according to certain embodiments.

FIG. 5 is a simplified diagram of example of training a generative model based on feedback procedure as a result of generating a second graph network, according to certain embodiments. In some embodiments, the generative model(s) 502 may be trained (e.g., by graph system 402 with respect to FIG. 4), using any suitable machine-learning algorithms (e.g., supervised, unsupervised, etc.) and any suitable number of training data sets (e.g., training data 504). A "supervised" machine-learning algorithm refers to a machine learning task that includes learning an inferred function that maps an input to an output, based at least in part on a labeled training data set, for which example input/output pairs are known. "Unsupervised" machine-learning algorithms refer to a set of algorithms that are used to analyze and cluster unlabeled data sets (e.g., unlabeled data 508). These algorithms are configured to identify patterns or data groupings without the need for human intervention. In some embodiments, any suitable number of generative model(s) 502 may be trained during training phase 510.

At least one model of model(s) may be trained to one or more nodes and/or edges, in accordance with at least one embodiment. The training data 504 may be utilized to prepare a generative model 502 for identifying nodes and edges in a graph network, comprising a curated set of historical or representative data sources, in which the relevant entities and relationships have been pre-identified or annotated. This training data 504 may include, by way of example, collections of documents, records, emails, transactional logs, organizational charts, or project databases that have been labeled to indicate which data elements correspond to discrete entities (e.g., employees, projects, locations, etc.) and which elements or patterns of co-occurrence or reference correspond to relationships or interactions between entities. Each sample in the training data 504 may further include metadata specifying the attributes of each node (e.g., names, roles, domains, etc.) and each edge (e.g., the nature of the relationship, frequency of interaction, or time period). The comprehensiveness and diversity of the training data are selected to ensure that the generative model 502 learns to recognize both common and contextually-nuanced patterns indicative of nodes and edges. The training data 504 for training one or more of generative model(s) 502 may include any suitable combination of individual and/or aggregate data values (current or historical) from one or more sources (e.g., data provider computer(s) 606). In some embodiments, the training data 504 for training these particular model(s) 502 may include any source connected over a network (e.g., network 616 with respect to FIG. 6). In some embodiments, the generative model(s) 502 may be trained to identify nodes and edges and to form and/or augment graph networks from the nodes and edges.

At least one generative model of generative model(s) 502 may be trained to implement any suitable node or edge detection technique, in accordance with at least one embodiment. The training data 504, for training one or more of generative model(s) 502 to identify nodes and/or edges, may include any suitable combination of data including, but not limited to, employees, contractors, customers, suppliers, projects, tasks, physical assets, digital resources, organizational locations, departments, business units, product lines, intellectual property items, accounts, communications, transactions, events, or devices. The edges connecting these nodes may comprise, in a non-limiting manner, relationships or associations including, but not limited to, project participation, supervisory or reporting relationships, contractual agreements, shared resource usage, physical or logical proximity, co-authorship, collaboration, communication exchanges, transactional linkages, asset transfers, joint venture participation, data sharing, event co-occurrence, or any other operational, organizational, or informational relationship, as may be defined by the attributes present in the underlying data set. In some embodiments, the training data 504 for training these particular model(s) 502 may include any suitable combination of data from data stores (e.g., virtual data store 708, physical data store 706, historical data store 710, etc.).

According to some embodiments, the generative model(s) 502 may be utilized to generate graph networks, comprising nodes and edges from raw or unstructured input data, with the generative model(s) 502 employing embedding vectors as a mechanism for entity and relationship extraction. During operation, the generative model(s) 502 may receive input data, (e.g., collections of documents, transaction records, communication logs, or other organizational data-sets from sets of databases) and process this data to compute embedding vectors that represent the semantic and contextual characteristics of potential entities (nodes) and inter-entity relationships (edges). These embedding vectors may be numerical representations learned by the model to capture similarities, distinctions, and structural patterns among the data elements in a continuous, lower-dimensional space. The generative model(s) 502 evaluates the embedding vectors to determine which data elements correspond to nodes, then, generating a node in the graph network for each distinct entity, whose embedding vector indicates sufficient separation or uniqueness, relative to others. Similarly, the generative model(s) 502 may analyze pairs of embedding vectors to identify potential edges, then, generating an edge between two nodes, if their embeddings exhibit a degree of similarity or relatedness that exceeds a learned or predefined threshold. The generative model(s) 502 may further assign weights or attributes to the edges, based at least in part on the magnitude of similarity or additional contextual cues present in the embeddings. Training of the generative model(s) 502 may be conducted using a corpus of graph networks 507 that have been previously constructed and labeled, or, by way of feedback procedure 514, newly created graph networks (e.g., second graph network 414 with respect to FIG. 4) such that each graph network includes nodes and edges that accurately reflect the entities and relationships present in the corresponding data. The training process may be guided by a fidelity score or accuracy metric, which quantitatively evaluates how closely the graph network generated by the generative model 502 and/or the graph system (e.g., graph system 402 with respect to FIG. 4) matches the ground truth or reference graph network topology. The fidelity score may take into account factors, such as the correct identification of nodes, the presence and placement of edges, the assignment of attributes, and/or the overall structural coherence of the generated and/or augmented graph networks. The generative model(s) 502 may iteratively adjust its internal parameters, including the mechanisms for computing and interpreting embedding vectors, in order to maximize the fidelity score across the training data. In some embodiments, the generative model(s) 502 may employ reinforcement learning or adversarial training techniques, where the reward or loss function is based at least in part on the fidelity score, such that the generative model(s) 502 learn(s) to generate graph networks that are both accurate and robust.

At least one model of the generative model(s) may be trained to identify nodes and edges within previously unseen, unlabeled data, by using patterns, features, and contextual relationships learned during the training phase 510, on both labeled data 506 and unlabeled data 508. Initially, the generative model(s) 502 are trained using labeled data 506, where entities and relationships are annotated, enabling the generative model(s) 502 to calculate characteristics and interconnections that define nodes and edges. The generative model(s) 502 applies the learned representations and decision boundaries to extract entities (nodes) and infer relationships (edges), based at least in part on recognized textual, numerical, or structural cues. For example, the generative model(s) 502 may identify a new project, employee, or location as a node, by matching learned patterns of entity references, and establish an edge, by detecting co-occurrence, participation, or referenced interactions, even if the specific data points or combinations have not been previously encountered. In general, the generative model(s) 502 may include any suitable number of models. The generative model(s) 502 may be individually trained to identify, from the training data 504 discussed above, a likelihood or confidence or accuracy of output(s) 512 (which is an example of output 208 with respect to FIG. 2), provided by generative model(s) 502. In some embodiments, the generative model(s) 502 may be configured to determine a value, corresponding to the examples provided above; and the likelihood and/or confidence value may indicate a likelihood or degree of confidence that the output, provided by the generative model(s), is accurate, based at least in part on a feedback procedure 514, which returns some or all of output(s) 512 as feedback data 516 to the generative model(s) 502.

In general, the generative model(s) 502 can be trained during training phase 510, using a supervised learning algorithm and labeled data 506 to identify outputs, described in the examples above. A likelihood value may be a binary indicator, a percentage, a confidence value, or the like that indicates a degree of likelihood. The likelihood value can be a binary indicator that indicates whether a particular budget amount is likely or unlikely to be breached, or the likelihood value can indicate a likelihood and/or confidence that the predicted output will be experienced in the future. Labeled data 506 may be any suitable portion of potential training data (e.g., training data 504) that can be used to train model(s) to produce the output described above. Labeled data 506 may include any suitable number of examples of current and/or historical data. In some examples, labeled data 506, used for training the generative model(s) 502, comprises a collection of data instances in which specific elements, corresponding to entities (nodes) and relationships (edges), have been explicitly identified and annotated by human experts or through automated labeling processes. This labeled data 506 may include, for example, documents, records, communications, or transactional logs, in which each occurrence of a relevant entity (e.g., an employee, project, location, or device) is marked with a unique identifier or tag, and every instance of a relationship (e.g., project participation, communication exchange, asset transfer, etc.) is similarly annotated to indicate the linkage between corresponding entities. The labeled data 506 further provides ground truth for the attributes associated with each node and edge (e.g., names, types, timestamps, or descriptive metadata), serving as a reference standard for supervised learning. In some embodiments, labeled data 506 may include labels that identify known likelihood and/or actual values.

The generative model(s) 502, and the various types of those models discussed above, may include any suitable number of models that are trained, using unsupervised learning techniques, to identify the likelihood/confidence and/or a predicted amount corresponding to the examples provided above. Unsupervised machine-learning algorithms are configured to learn patterns from untagged data. In some embodiments, the training phase 510 may utilize unsupervised machine-learning algorithms to generate one or more of the generative model(s) 502. For example, the training data 504 may include unlabeled data 508. Unlabeled data 508 may be utilized, together with an unsupervised learning algorithm, to segment the entries of unlabeled data 508 into groups. The unlabeled data 508 may be used, in the context of training the generative model(s) 502, to comprise raw or unstructured data sources, in which the relevant entities (nodes) and relationships (edges) have not been explicitly identified or annotated. This unlabeled data may include, by way of non-limiting examples, collections of emails, text documents, transactional records, log files, sensor outputs, or other organizational datasets, where potential nodes and edges are present but have not been marked or categorized. The generative model(s) 502 may utilize this unlabeled data, often in conjunction with labeled data 506, as part of a semi-supervised or unsupervised learning process, to discover latent patterns, recurring structures, and contextual associations that characterize entities and their interconnections within the data. Through exposure to large volumes of such unlabeled data, the generative model(s) 502 are able to refine internal representations, improve their ability to generalize beyond the examples provided in the labeled data 506, and enhance their accuracy and robustness when identifying nodes and edges within new, previously unseen data sets (e.g., data 505 that may be user feedback, graph networks 507, and/or suitable equivalents). The unsupervised learning algorithm may be configured to cause similar entries to be grouped together in a common group. An example of an unsupervised learning algorithm may include clustering methods (e.g., k-means clustering, DBScan). In some embodiments, the unlabeled data 508 may be clustered with the labeled data 506, such that unlabeled instances of a given group may be assigned the same label as other labeled instances within the group.

In some embodiments, a fidelity score used to evaluate the generative model is computed by comparing the categories and attributes of generated meta edges to those in a set of ground truth labeled examples. The score may be calculated using standard metrics such as accuracy (the proportion of correctly categorized meta edges), precision and recall (for each category), or mean squared error (for continuous attributes). For example, if the generative model 502 generates one hundred meta edges and eighty five match the ground truth in both node pairing and category, the fidelity score may be 85%. The system uses this score to determine whether the generative model 502 meets a performance threshold; if not, additional training or adjustment is triggered. Generative model 502 updates may use supervised learning with new labeled data, reinforcement learning based at least in part on operational feedback, batch balancing, or incremental retraining with recent graph networks 507 to improve future fidelity.

In some embodiments, the generative model(s) 502 identifies at risk nodes in graph networks by analyzing the paths and edge relationships connecting a node associated with a malicious digital engagement in the virtual network to nodes in the physical network, via meta edges. The generative model(s) 502 may be configured to use features such as the type and frequency of past interactions, the context of recent anomalies, and the strength of connectivity (e.g., edge weights, recency, or frequency of meta edge traversals) to compute a risk score for each node.

In some embodiments, any suitable portion of the training data 504 may be utilized during the training phase 510 to train the generative model(s) 502. For example, 70% of labeled data 506 and/or unlabeled data 508 may be utilized to train the generative model(s) 502. Once trained, or at any suitable time, the generative model(s) 502 may be evaluated to assess their quality (e.g., the accuracy of output(s) 512, with respect to the labels corresponding to labeled data 506). By way of example, a portion of the examples of labeled data 506 and/or unlabeled data 508 may be utilized as input to the generative model(s) 502, in order to generate output(s) 512. By way of an example, an example of the labeled data 506 may be provided as input, and the corresponding output (e.g., output(s) 512) may be compared to the label already known to be associated with the example. If some portion of the output (e.g., a label) matches the example label, that portion of the output may be deemed accurate. Any suitable number of labeled data 506 (e.g., ground truth training examples) may be utilized; and a number of accurate labels may be compared to the total number of examples provided (and/or the total number of labels previously identified), to determine an accuracy value for a given model that quantifies a degree of accuracy for the generative model 502. For example, if ninety out of one hundred of the input examples generate output labels that match the previously-known example labels, the generative model 502 being assessed may be determined to have a 90% fidelity score.

In some embodiments, categories and their corresponding labels are used to train the generative model 502 to aid the graph system in constructing graph networks that reflect structures and relationships present in the data. Categories may include, for example, relationship types that specify the nature of connections between entities (e.g., "transaction," "communication," or "affiliation"), node categories that indicate the type or class of each entity (e.g., "user," "device," "location," or "organization"), edge attribute categories that describe quantitative or qualitative properties of edges (e.g., confidence level, weight, time stamp, or frequency), and anomaly categories that designate whether a node or edge represents a normal or atypical instance within the network (e.g., "suspicious transaction" or "unusual activity"). During training, each data point may be annotated with one or more labels corresponding to these categories; and the generative model is optimized to learn mappings (e.g., from raw or unstructured input data) to the correct category labels. By evaluating the generative model's 502 predictions against the ground truth labels, using supervised learning techniques and suitable performance metrics, systems described herein may iteratively update parameters to improve its ability to assign accurate labels, enhancing a capacity to generate graph networks that faithfully represent both the structural and semantic characteristics of the data.

In some embodiments, as the generative model(s) 502 are utilized for subsequent inputs, the subsequent output generated by the generative model(s) 502 may be added to corresponding input and used to retrain and/or update the generative model(s) 502 at 516. In some embodiments, the example may not be used to retrain or update the generative model 502 until feedback procedure 514 is executed. In feedback procedure 514, the example (e.g., an example including one or more historical consumption data instances, corresponding to one or more devices and/or racks) and the corresponding output, generated for the example by one of the generative model(s) 502, is presented to a user, and the user identifies whether the output generated (e.g., amount and/or likelihood confidence value) is correct for the given example. The feedback data 516, provided to the generative model(s) 502, may include some or all of the output 512, generated by the generative model(s) 502 during training phase or deployment phase, and is used as an additional input for iterative training, validation, or refinement of the generative model's 502 performance. This feedback data 516 may include, by way of example, the entities (nodes) and relationships (edges) identified by the generative model in previously unlabeled data, along with any associated attributes, confidence scores, or annotations produced by the generative model 502. The feedback data 516 may be further augmented or corrected by human reviewers or validation systems (e.g., graph system 102), thereby creating a stream of semi-supervised or reinforcement learning inputs. The training process, depicted in FIG. 5 (e.g., method 500), may be performed any suitable number of times, at any suitable interval, and/or according to any suitable schedule, such that the accuracy of the generative model(s) 502 is improved over time.

In some embodiments, a fidelity score of the generative model(s) 502 may be determined, based, at least in part, on a comparison of one or more categories associated with the meta edges to ground truth training examples, providing a quantitative assessment of how accurately the generative model(s) 502 construct cross-domain relationships, within the generated graph network. This process may involve, for example, matching meta edges, generated by the generative model(s) 502, to corresponding ground truth meta edges and evaluating the alignment of their associated categories, which can include relationship types (e.g., "transaction," "affiliation"), node categories (e.g., "user," "location"), edge attribute categories (e.g., confidence scores, weights, or timestamps), or anomaly categories (e.g., "suspicious activity"). The fidelity score may be calculated using various statistical and classification metrics (e.g., determining the proportion of meta edges for which the predicted category matches the ground truth category, computing precision for each category type, or using regression metrics (e.g., mean squared error for continuous edge attributes). In some examples, the fidelity score may comprise a composite value that combines multiple metrics (e.g., a weighted sum of category-level scores or a structural similarity measure (e.g., Jaccard similarity, graph edit distance, etc.) between the generated and ground truth graphs.

In some embodiments, the generative model(s) 502 may be updated using labeled data 506 associated with the meta edges such that the update process is guided, at least in part, by the fidelity score that quantitatively assesses the generative model's 502 performance. Meta edges may represent a variety of cross-domain relationships, such as links between a user's digital account activity and a presence of the user at a physical location, associations between online transactions and real-world purchases, or connections between virtual communications and actual event attendance. The labeled data 506 may specify categories or attributes for these meta edges, including relationship type (e.g., "transaction," "attendance," "communication", etc.), edge attributes (e.g., confidence level, timestamp, transaction amount), or anomaly designations (e.g., "suspicious activity"). The fidelity score may be calculated by comparing the predicted categories or attributes of the generated meta edges to those in the ground truth labeled data, using metrics, such as accuracy score or mean squared error, to capture both structural and semantic alignment. Based at least in part on the fidelity score (e.g., by identifying areas where meta edge labeling accuracy is low or discrepancies are detected) the generative model(s) 502 internal parameters may be iteratively adjusted or retrained with additional labeled example to improve the generative model(s) capacity to accurately represent, categorize, and/or relate entities across virtual and physical domains.

In some embodiments, the one or more categories may include at least one of: relationship types of the plurality of entities, node categories of the plurality of entities, edge attribute categories associated with the meta edges, or anomaly categories associated with the plurality of entities. Examples of relationship types may encompass a range of interactions or connections between entities, such as "transaction" (e.g., a payment from one user to another), "communication" (e.g., an email or message exchange), "affiliation" (e.g., membership or employment links), "collaboration" (e.g., co-authorship or joint project participation), "supervision" (e.g., managerial or oversight relationships), or "co-location" (e.g., presence at the same physical site or event). Node categories may further classify entities according to their nature or role, (e.g., "user," "device," "location," "organization," or "event"). Edge attribute categories may specify additional properties of the meta edges, including confidence scores, weights, time stamps, or frequency of interaction. Anomaly categories may denote whether a node or edge represents a typical or atypical instance, such as labeling certain transactions as "suspicious" or identifying rare behavioral patterns.

Nodes may be clustered into the previously defined categories using a graph-based clustering algorithm, (e.g., k-means, hierarchical clustering, or community detection like the Louvain method), applied to node features and graph distances. Clustering may be performed using features such as node attribute vectors (e.g., device type, location, recent activity), and/or risk scores. The clustering algorithm groups nodes that are similar in attribute space and close in the graph network, producing clusters that correspond to operationally meaningful categories. For instance, nodes directed towards a particular context and with similar edge relationships may form a single cluster, while dissimilar nodes with different edge relationships may form another. These clusters are then mapped to the categories established during partitioning, enabling targeted responses, action, control of devices, control of access to a network, control of access to an account, mitigation of malicious actions, and/or notification actions.

Figure 6:
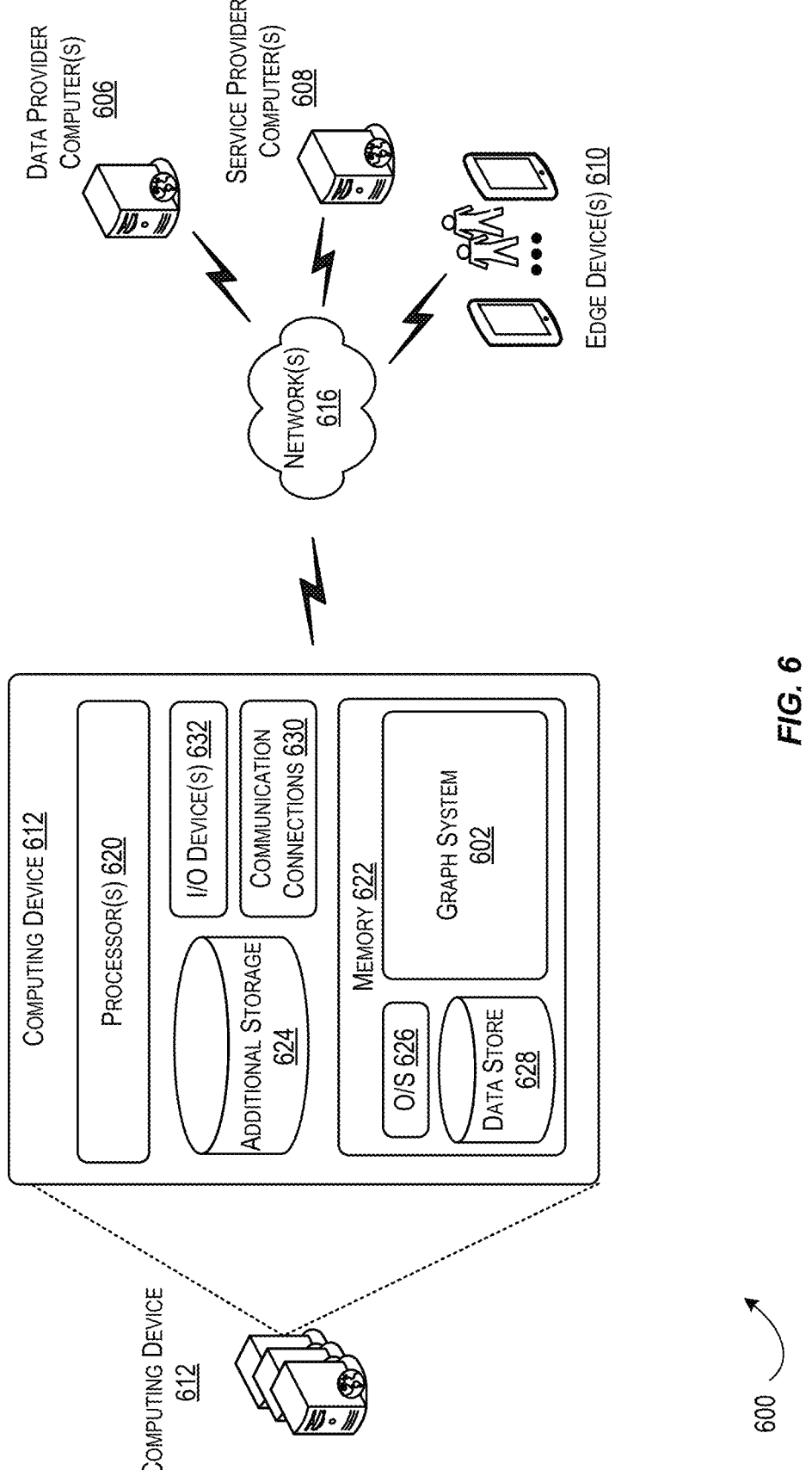
FIG. 6 is a simplified diagram of an example data network, according to certain embodiments.

FIG. 6 is a simplified diagram of an example data network, according to certain embodiments. A computing device 612 may host (or otherwise run) a graph system 602, which is an example of graph system 102, with respect to FIG. 1. The system 600 may be configured to generate graph networks, identify nodes, and determine edges between nodes. In some embodiments, data provider computer(s) 606, service provider computer(s) 608, and/or one or more edge device(s) 612 (e.g., edge device 201 with respect to FIG. 2) may communicate with a computing device 612 over one or more network(s) 616. Network(s) 616 may include any suitable combination of different types of networks, such as cable networks, the Internet, wireless networks, cellular networks, and other private and/or public networks.

In some embodiments, the computing device 612 may include one or more processors (e.g., processor(s) 620). The processor(s) 620 may be implemented in hardware, computer-executable instructions, firmware, or combinations thereof. Computer-executable instruction or firmware implementations of the processor(s) 620 may include computer-executable or machine-executable instructions written in any suitable programming language. Computing device 618 may include memory 622. The memory 622 may store computer-executable instructions that are loadable and executable by the processor(s) 620, as well as data generated during the execution of these programs. The memory 622 may be volatile (such as RAM) and/or non-volatile (such as ROM, flash memory, etc.). The computing device 612 may include additional storage (e.g., storage 624), which may include removable storage and/or non-removable storage. Storage 624 may include, but is not limited to, magnetic storage, optical disks and/or tape storage. The disk drives and their associated computer-readable media may provide non-volatile storage of computer-readable instructions, data structures, program components, and other data for the computing devices.

The memory 622 and/or storage 624 may be examples of non-transitory computer-readable storage media. Computer-readable storage media may include volatile, non-volatile, removable, or non-removable media implemented in any method or technology for storage of information, such as computer-readable instructions, data structures, program components, or other data. Memory 622 and/or additional storage 624 may include, but are not limited to, any suitable combination of PRAM, SRAM, DRAM, RAM, ROM, EEPROM, flash memory or other memory technology, CD-ROM, DVD, magnetic tape, magnetic disk storage or other magnetic storage devices, or any other medium which can be used to store desired information, and which can be accessed by the computing device 612. Computer-readable media may include computer-readable instructions, program components, or other data transmitted within a data signal, such as a carrier wave or other transmission. However, as used herein, computer-readable storage media does not include computer-readable communication media. The memory 622 may include an operating system 626, one or more data stores 628, and/or one or more application programs, components, or services. The computing device may also contain communications connection(s) 630 that allow the computing device 612 to communicate with a stored database, another computing device, a server, user terminals, and/or other devices (e.g., via one or more networks, not depicted). The computing device may include I/O device(s) 632, such as a keyboard, a mouse, a stylus, a voice input device, a touch input device, a display, speakers, a printer, etc. In some embodiments, the memory 622 may store instructions that, when executed by processor(s) 620, implement the functionality described herein, with respect to the graph system 602 (e.g., graph system 102 of FIG. 1, graph system 202 of FIG. 2, graph system 302 of FIG. 3, etc.).

Figure 7:
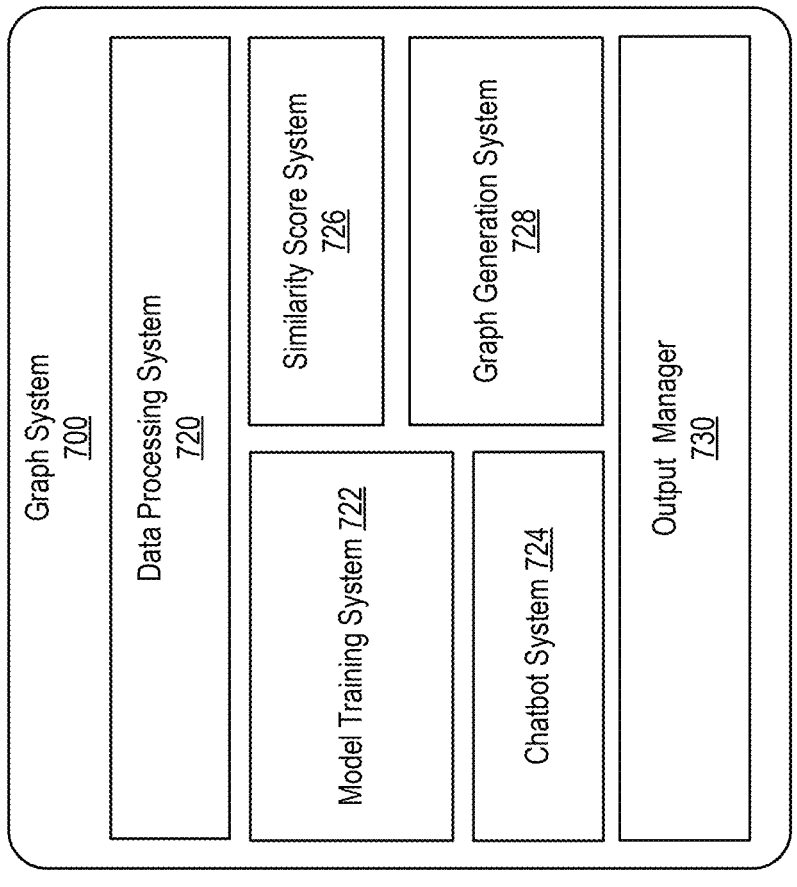
FIG. 7 is a simplified diagram of example computer architecture, according to certain embodiments.

FIG. 7 is a simplified diagram of example computer architecture, according to certain embodiments. FIG. 7 is a schematic diagram of an example computer architecture for the graph system 102 of FIG. 1, or any system, device, or component disclosed herein, including a plurality of components that may perform functions in accordance with at least one embodiment. Graph system 700 may be executed by the computing device 612 of FIG. 6. The components 702 may be software components, hardware components, or a combination thereof. If the components are software components, the components can be embodied on a computer-readable medium and processed by a processor, in any of the computer systems described herein. It should be noted that any component or data store described herein, may be, in some embodiments, be a service responsible for providing functionality corresponding to the component described below. The components 702 may be execute as part of the graph system 700; or the components 702 may exist as separate components or services, external to the graph system 700. In some embodiments, the components 702 may be executed by the same or different computing devices, as a service, as an application, or the like.

In this example, databases can be maintained, generated, or otherwise accessed from various data stores, either remote or local to the graph system 700, to achieve the functions described herein. The graph system 700, as depicted in FIG. 7, includes a data processing system 720, model training system 722, similarity score system 724, graph generation system 726, chatbot system 728, and output manager 730. Some functions of the systems 720, 722, 724, 726, 728, and output manager 730 are described below. For clarity, a brief, non-limiting description of each of the components is provided in the following paragraphs.

The data processing system 720 may receive any suitable data, such as entity data or prior data, from one or more networks including the Internet, wide area networks, or local area networks. The data processing system 720 may be configured to store received data in a corresponding data store. In some embodiments, the data processing system 720 may receive and store training data, or may access other data managed by separate systems. The data processing system 720 may invoke the functionality of any other components based, at least in part, on suitable conditions or triggers.

The model training system 722 may include any number of programs, algorithms, or computer-readable instructions that, when executed, train a generative model and may produce a production generative model for deploying in networks for other systems and/or in cloud environments. Training may utilize datasets retrieved from training data (e.g., training data 504 with respect to FIG. 5) and/or other data stores configured to store such information. The model training system 722 may use supervised learning algorithms to train one or more models with the training data and may periodically update models by checking for new or updated training data. Data corresponding to trained models may be stored in model data or other suitable data stores.

The similarity score system 724 may be configured to compare natural language information, document text, and/or or metadata to nodes and edges within a graph network. Using predefined or dynamically learned similarity metrics, the similarity score system 724 can assess how closely new or existing data matches the content associated with graph nodes or edges. For example, the graph system 700 may calculate similarity scores by analyzing key phrases, context, and/or metadata, determining whether a query or document meets or exceeds a threshold for relevance or association. The similarity score system 724 supports identification of new relationships, helps recognize when further expansion of the graph network is needed, and/or enables more accurate and context-sensitive responses.

The graph generation system 726 may be responsible for constructing, augmenting, or otherwise updating the graph network by creating nodes and edges based on the available data. This graph generation system 726 may crawl one or more databases to extract documents, then generate nodes for each document and assign metadata attributes. The graph generation system 726 analyzes document content, metadata, and similarity scores to identify relationships between nodes, forming edges that represent these connections. The graph generation system 726 may also dynamically expand the graph network by adding new nodes and edges when additional data is incorporated or when similarity thresholds are adjusted ensuring the graph accurately reflects the evolving set of relationships within the data.

The chatbot system 728 enables direct interaction with users, receiving requests and providing responses that are customized according to user queries. The chatbot system 728 may utilize generative models to synthesize natural language answers, incorporating information from the graph network and other components. When a request is received, the chatbot system 728 inserts the request into a prompt for the generative model and evaluates the output in view of similarity scores and graph relationships. If the output does not meet the similarity threshold or lacks sufficient relevance to the graph network, the chatbot system 728 may trigger the graph generation system 728 to expand the network graph topology or access additional data sources to improve the response.

The output manager 730 may perform operations in conjunction with input from one or more of the components 702. For example, the output manager 730 may generate and transmit responses to users, notifications, and/or alerts based on detection of new relationships, updated similarity scores, and/or changes in the graph network. Output manager 730 may also format and deliver contextual information, update metadata, and/or initiate workflow actions in response to user requests and/or events. Additional operations may include the dynamic adjustment of system parameters, annotation of nodes and edges, and/or integration with external services and communication interfaces.

FIG. 8 is a simplified diagram of an example method 800 for staged undefined object heterogeneity optimization, according to certain embodiments. A non-transitory computer-readable storage medium may store computer-executable instructions that, when executed by at least one processor, cause at least one computer to perform instructions comprising the operations of the method 800. It should be appreciated that the operations of the method 800 may be performed in any suitable order, not necessarily the order depicted in FIG. 8. Further, the method 800 may include additional, or fewer operations than those depicted in FIG.

8. The operations of method 800 may be performed by any suitable portion of the graph system 700 of FIG. 7 (an example of the graph system 102 of FIG. 1) which may include one or more computing devices such as computing device 612 of FIG. 6.

At 802, the method 800 may includes the step of receiving a request from an edge device. By way of a few non-limiting examples, the edge device (e.g., edge device 201 with respect to FIG. 2) may be a mobile phone operated by a field technician seeking troubleshooting instructions, a laptop used by a researcher requesting access to prior experimental data, and/or a smart sensor requesting updated configuration settings for an industrial system.

At 804, the method 800 may includes the step of providing the request (e.g., request 203 with respect to FIG. 2) in a prompt to a generative model (e.g., generative model 206 with respect to FIG. 2). For instance, the request may be inserted into a prompt to the generative model to seek a summary of recent weather events impacting a specific location or to generate a list of maintenance tasks for a piece of equipment.

At 806, the method 800 includes a negative response condition may be determined that an appropriate response is not found based in accordance with a comparison of on a first similarity score being in accordance with a first pre-determined threshold. As an example, if the edge devices provides a request for the latest version of a policy document and the output from the generative model does not closely match the metadata or content of any known policy documents, the graph system may conclude that the response is inadequate and trigger the negative response condition. In some examples, the negative response condition indicates a lack of a response or a non-response condition (e.g., no response is provided by the generative model or graph system).

At 808, the method 800 may includes the step of comparing natural language information to a first graph network in accordance with a first pre-defined degree of separation. By way of example, the first graph network (e.g., first graph network 212 with respect to FIG. 2) may include a set of nodes (e.g., node 330-1, node 330-2, node 330-3, etc. with respect to FIG. 3) that represent a plurality of entities and a set of edges (e.g., edge 332-1, edge 332-2, etc. with respect to FIG. 3) that represent relationships between the plurality of entities and the natural language information includes at least one of a portion of the output (e.g., output 208 with respect to FIG. 2) or a portion of the request. The first pre-defined degree of separation includes two or fewer edges, and wherein the second pre-defined degree of separation includes at least one edge more than the first pre-defined degree of separation. For example, if a request references a particular research topic, the graph system may compare the request to a graph network where nodes represent publications and edges indicate shared authors or referenced keywords, analyzing connections that are within two or fewer edges to minimize processing power overhead.

At 810, the method 800 may includes the step of determining a second similarity score based at least in part by comparing natural language text of a second set of nodes with the natural language information. By way of example, the second set of nodes do not occur in the first graph network and the second similarity score represents similarity between at least the natural language information and first metadata associated with the second set of nodes. For example, the graph system may identify that relevant information exists in newly published articles or external databases not yet incorporated into the first graph network, and calculate how closely these new nodes match the request.

At 812, the method 800 may includes the step of extracting second metadata from the second set of nodes (e.g., node 330-4, node 330-8, etc.) based at least in part on the second similarity score being in accordance with a second pre-determined threshold. By way of a non-limiting example, the second set of nodes is within a second pre-defined degree of separation different from the first pre-defined degree of separation. For example, if the request concerns emerging trends in a field, the graph system may extract metadata from recent conference proceedings that are three degrees of separation away from the nodes in the first graph network (e.g., shared themes or authors).

At 814, the method 800 may includes the step of creating a second graph based at least in part by creating edges between nodes of the second set of nodes, the first set of nodes, or both, that represent relationships between nodes of the second set of nodes and/or the first set of nodes. By way of a non-limiting example, the second graph network may be different than the first graph network. For example, the graph system may integrate connections between recently discovered research collaborations and existing institutional partnerships, forming a second graph network that reflects both historical and emerging relationships.

At 816, the method 800 may includes the step of generating a response to the request by accessing particular metadata of the second metadata associated with at least one node of the second set of nodes by extracting and formatting contextual natural language from particular metadata. For example, the graph system may compile a summary of research findings, include relevant publication dates, and/or highlight notable contributors, formatting the information in natural language (e.g., plain English) to address the request At 818, the method 800 may includes the step of providing the response including the particular metadata to the edge device. By way of a non-limiting example, extracting portions of information from the second metadata, transforming the portions of information into plain English summary with a context associated with the request, and inserting one or more hyperlinks into the plain English summary in accordance with documents associated with the second metadata such that the response may include the plain English summary, the one or more hyperlinks, or both. For instance, the response may include a summary of relevant research outcomes, with direct links to cited articles or supporting documentation for further exploration.

In various embodiments, the method 800 may include deploying the second graph network to the cloud environment, updating one or more skills associated with the chat bot that received the request based at least in part on the second graph network. In some embodiments, the request is received by a first chat bot, and in addition or alternatively, the method 800 may include creating a new skill for the first chat bot based at least in part on the second metadata or the response, and storing the new skill in the cloud environment for retrieval by a second chat bot different from the first chat bot. For example, if the second graph network produces a correct response (verified by the graph system and/or edge device), the chatbot may have its skill set updated and shared across other chatbots connected to the network (e.g., cloud network) to improve future responses for other requests at other edge devices.

In various embodiments, the method 800 may include creating a production generative model by updating the generative model, the second graph network, the second metadata, the response, or combinations thereof, as unlabeled training data and deploying the production generative model in the cloud environment. For example, when a newly discovered relationship improves the accuracy of responses, the model may be retrained and redeployed, allowing other systems to benefit from the enhanced understanding.

In various embodiments, the method 800 includes receiving, from the edge device, a second request associated with the response, the second request associated with controlling an asset associated with an entity of the plurality of entities and the response, controlling the asset associated with the first entity to transfer to a second entity, updating the first graph network or the second graph network in accordance with the transfer. For example, the graph system may initiate the transfer of a digital asset such as a dataset or document from one research team to another, and the graph network is updated to reflect the new ownership or association.

FIG. 9 is a simplified diagram of an example method 900 for staged undefined object heterogeneity optimization, according to certain embodiments. A non-transitory computer-readable storage medium may store computer-executable instructions that, when executed by at least one processor, cause at least one computer to perform instructions comprising the operations of the method 900. It should be appreciated that the operations of the method 900 may be performed in any suitable order, not necessarily the order depicted in FIG. 9. Further, the method 900 may include additional, or fewer operations than those depicted in FIG. 9. The operations of method 900 may be performed by any suitable portion of the graph system 700 of FIG. 7 (an example of the graph system 102 of FIG. 1) which may include one or more computing devices such as computing device 612 of FIG. 6.

At 902, the method 900 may includes the step of receiving a request from an edge device. By way of a few non-limiting examples, the edge device (e.g., edge device 201 with respect to FIG. 2) may be a mobile phone operated by a field technician seeking troubleshooting instructions, a laptop used by a researcher requesting access to prior experimental data, and/or a smart sensor requesting updated configuration settings for an industrial system.

At 904, the method 900 may includes the step of providing the request (e.g., request 203 with respect to FIG. 2) in a prompt to a generative model (e.g., generative model 206 with respect to FIG. 2). For instance, the request may be inserted into a prompt to the generative model to seek a summary of recent weather events impacting a specific location or to generate a list of maintenance tasks for a piece of equipment.

At 906, the method 900 includes a negative response condition may be determined that an appropriate response is not found based in accordance with a comparison of on a first similarity score being in accordance with a first predetermined threshold. As an example, if the edge devices provides a request for the latest version of a policy document and the output from the generative model does not closely match the metadata or content of any known policy documents, the graph system may conclude that the response is inadequate and trigger the negative response condition. In some examples, the negative response condition indicates a lack of a response or a non-response condition (e.g., no response is provided by the generative model or graph system).

At 908, the method 900 may includes the step of comparing natural language information to a first graph network in accordance with a first pre-defined degree of separation. By way of example, the first graph network (e.g., first graph network 212 with respect to FIG. 2) may include a set of nodes (e.g., node 330-1, node 330-2, node 330-3, etc. with respect to FIG. 3) that represent a plurality of entities and a set of edges (e.g., edge 332-1, edge 332-2, etc. with respect to FIG. 3) that represent relationships between the plurality of entities and the natural language information includes at least one of a portion of the output (e.g., output 208 with respect to FIG. 2) or a portion of the request. The first pre-defined degree of separation includes two or fewer edges, and wherein the second pre-defined degree of separation includes at least one edge more than the first pre-defined degree of separation. For example, if a request references a particular research topic, the graph system may compare the request to a graph network where nodes represent publications and edges indicate shared authors or referenced keywords, analyzing connections that are within two or fewer edges to minimize processing power overhead.

At 910, the method 900 may includes the step of determining a second similarity score based at least in part by comparing natural language text of a second set of nodes with the natural language information. By way of example, the second set of nodes do not occur in the first graph network and the second similarity score represents similarity between at least the natural language information and first metadata associated with the second set of nodes. For example, the graph system may identify that relevant information exists in newly published articles or external databases not yet incorporated into the first graph network, and calculate how closely these new nodes match the request.

At 912, the method 900 may includes the step of creating a second graph based at least in part by creating edges between nodes of the second set of nodes, the first set of nodes, or both, that represent relationships between nodes of the second set of nodes and/or the first set of nodes. By way of a non-limiting example, the second graph network may be different than the first graph network. For example, the graph system may integrate connections between recently discovered research collaborations and existing institutional partnerships, forming a second graph network that reflects both historical and emerging relationships.

At 914, the method 900 may includes the step of extracting second metadata from the second set of nodes (e.g., node 330-4, node 330-8, etc.) based at least in part on the second similarity score being in accordance with a second predetermined threshold. By way of a non-limiting example, the second set of nodes is within a second pre-defined degree of separation different from the first pre-defined degree of separation. For example, if the request concerns emerging trends in a field, the graph system may extract metadata from recent conference proceedings that are three degrees of separation away from the nodes in the first graph network (e.g., shared themes or authors).

At 916, the method 900 may includes the step of generating a response to the request by accessing particular metadata of the second metadata associated with at least one node of the second set of nodes by extracting and formatting contextual natural language from particular metadata. For example, the graph system may compile a summary of research findings, include relevant publication dates, and/or highlight notable contributors, formatting the information in natural language (e.g., plain English) to address the request At 918, the method 900 may includes the step of providing the response including the particular metadata to the edge device. By way of a non-limiting example, extracting portions of information from the second metadata, transforming the portions of information into plain English summary with a context associated with the request, and inserting one or more hyperlinks into the plain English summary in accordance with documents associated with the second metadata such that the response may include the plain English summary, the one or more hyperlinks, or both. For instance, the response may include a summary of relevant research outcomes, with direct links to cited articles or supporting documentation for further exploration.

In various embodiments, when the graph system generates a response that successfully addresses the user's request, it can also create a new skill module for the chatbot that handled the request. This new skill module may be based on the metadata, response, and/or procedural steps used to construct the response and is stored in the cloud environment. Other chatbots operating within the same cloud environment may then retrieve this skill as needed prior to constructing and/or augmenting graph networks, allowing the chatbots to respond to similar requests without needing to repeat the full graph augmentation process.

In various embodiments, the method 900 may include deploying the second graph network to the cloud environment, updating one or more skills associated with the chat bot that received the request based at least in part on the second graph network. In some embodiments, the request is received by a first chat bot, and in addition or alternatively, the method 900 may include creating a new skill for the first chat bot based at least in part on the second metadata or the response, and storing the new skill in the cloud environment for retrieval by a second chat bot different from the first chat bot. For example, if the second graph network produces a correct response (verified by the graph system and/or edge device), the chatbot may have its skill set updated and shared across other chatbots connected to the network (e.g., cloud network) to improve future responses for other requests at other edge devices.

In various examples, skills retrieved from the cloud environment may allow chatbots to recognize complex request patterns, access new sources of data, and/or trigger workflow actions (e.g., retrieve the correct documents) directly to reduce a time and computational effort needed for future information retrieval tasks. For example, a chatbot that acquires a skill for processing asset transfer requests (e.g., ACH batch deposits) can apply that knowledge to subsequent requests, bypassing redundant graph network augmentations and improving the overall responsiveness of the graph system.

In various embodiments, the method 900 may include creating a production generative model by updating the generative model, the second graph network, the second metadata, the response, or combinations thereof, as unlabeled training data and deploying the production generative model in the cloud environment. For example, when a newly discovered relationship improves the accuracy of responses, the model may be retrained and redeployed, allowing other systems to benefit from the enhanced understanding.

In various embodiments, the method 900 includes receiving, from the edge device, a second request associated with the response, the second request associated with controlling an asset associated with an entity of the plurality of entities and the response, controlling the asset associated with the first entity to transfer to a second entity, updating the first graph network or the second graph network in accordance with the transfer. For example, the graph system may initiate the transfer of a digital asset such as a dataset or document from one research team to another, and the graph network is updated to reflect the new ownership or association.

In various embodiments, after providing a response, the graph system can interpret follow-up requests from the user to take action based on the answer (e.g., initiating an asset transfer, suspending traffic for the user in the cloud environment, updating permissions, or managing digital resources, etc.). Upon receiving the request, the graph system may validate the authorization, execute the operation (e.g., transferring a data file from one department to another), and then augment the graph network to reflect the new asset status and relationships between the involved nodes. This process ensures traceability and maintains the integrity of the graph network automatically while while automating complex transactions in response to requests from edge devices.

In various embodiments, the graph system may augment the response provided to the edge device by embedding hyperlinks that direct the user to underlying source documents, audit trails, and/or supplemental resources. These hyperlinks are generated (by the graph system) by associating segments of the response with the corresponding nodes or metadata within the graph network. For example, if a user requests regulatory compliance information, the graph system can create a plain English summary that answers the query and also includes clickable links to the original policy documents, recent amendments, and/or related compliance checklists. This allows users to quickly verify validity of the response and access more detailed content.

The graph system may also generate interactable interface elements (e.g., buttons, expandable sections, or context-sensitive menus) within the response delivered to the edge device. These interactable interface elements enable users to perform additional actions without issuing a new request (e.g., requesting further details, initiating a workflow, or toggling between different views of the data). For instance, a response summarizing project milestones might include buttons to display project participants, show timeline charts, and/or download supporting reports.

In various examples, when a user's request needs synthesizing information from multiple documents or data sources, the graph system may retrieve relevant segments from each source and use the generative model to aggregate and format the findings into a coherent, contextually appropriate response. For example, if a request seeks a comparison between two company policies or a summary of collaborative efforts across several research papers, the graph system locates and extracts pertinent excerpts from the corresponding nodes in the graph network (e.g., the second graph network). The generative model may process these excerpts, removing redundancies, aligning terminology to be consistent, and structuring the response in a readable, plain English format (or any other suitable language). This format may provide comprehensive, accurate, clear, and concise responses to providing information that draw upon a broad base of up-to-date and contextually linked information.

In a non-limiting example, a financial analyst working remotely may use an edge device (e.g., desktop computer) to submit a transaction-related request to a company's financial information system, asking, "Has Company A transferred any assets to Company B in the last quarter, and what were the transaction details?" The request is received by the graph system, which incorporates the analyst's natural language query into a prompt for a generative model. The generative model may attempt to generate a response based on its training data, and the output may be compared to the metadata of nodes and edges representing asset transfer documents in the graph system's first graph network. In this example, a similarity score falls below a pre-defined threshold because the generative model does not include the most recent proprietary transaction records (perhaps the generative model was trained a few years ago). Recognizing this negative response condition, the graph system may then compare the request against its first graph network, which contains nodes for companies, assets, contracts, and transaction records, and edges for relationships such as ownership and transfers, limited to entities within two degrees of separation. When the initial search does not yield a satisfactory match based on similarity scores, the graph system may expand its analysis by identifying new transaction records and external audit reports that have been recently added to the databases but are not yet part of the first graph network due to edges having not been analyzed yet. The graph system may determine a second similarity score by comparing the request to the metadata of these new nodes, including transaction summaries and regulatory filings that are outside the first graph network.

Continuing this non-limiting example, when the second similarity score meets the pre-defined threshold, the graph system may extract relevant metadata from these new nodes, such as details from a quarterly audit report confirming a recent asset transfer between Company A and Company B, which is three degrees of separation away from the original transaction nodes. The graph system may then create a second graph network, linking the new transaction node with existing nodes for the companies, as well as connecting supporting documents and contracts. This second graph network has a distinct topology, capturing broader and more recent transaction data. The graph system may generate a response to the analyst by extracting and formatting contextual natural language from the second metadata, producing a plain English summary: "Company A transferred $2 million in real estate assets to Company B on Aug. 30, 2025, as confirmed by the quarterly audit report and the transfer contract," and providing hyperlinks to the audit document and contract for further review.

Once the second graph network yields a correct response, the graph system may deploy the graph network to a cloud environment and update the chatbot's skill set to better handle asset transfer requests. The new skill may be stored and made available for retrieval by other chatbots in the environment (e.g., cloud environment) so that future similar requests are answered more quickly and accurately. The newly identified nodes, edges, and formatted response may also be used as unlabeled training data to retrain and update the generative model, which may then be deployed in the cloud environment to enhance subsequent transaction queries. In a follow-up request, the analyst may initiate an asset transfer approval workflow from the edge device and the graph system may control the digital asset associated with Company A, execute the transfer to Company B, and updates both the first and second graph networks to reflect the new ownership and transaction details. This entire process is supported across a range of operational environments, including desktop workstations in the office, mobile tablets used by field auditors, and cloud-based servers accessed by compliance teams, all interacting with the graph system to ensure real-time transaction tracking and regulatory compliance while accounting for deficiencies in generative models which are not up to date and/or may not have access to proprietary data.

The various embodiments can be further implemented in a variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system can also include a number of workstations running any of a variety of commercially available operating systems and other known applications for purposes such as development and database management. These devices can also include other electronic devices, such as dummy terminals, thin-clients, gaming systems, and other devices capable of communicating via a network.

Most embodiments utilize at least one network that would be familiar to those skilled in the art for supporting communications using any of a variety of commercially available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) may also be capable of executing programs or scripts in response to requests from user devices, such as by executing one or more Web applications that may be implemented as one or more scripts or programs written in any programming language, such as JavaR, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random-access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices will also typically include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile storage, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed. On the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order, unless otherwise indicated herein or otherwise clearly contradicted by context. The use of any and all examples or exemplary language (e.g., "such as") provided herein is intended merely to better illuminate embodiments of the disclosure and does not pose a limitation on the scope of the disclosure unless otherwise claimed. No language in the specification should be construed as indicating any non-claimed element as essential to the practice of the disclosure.

Where terms are used without explicit definition as recited herein, it is understood that the ordinary meaning of the word is intended, unless a term carries a special meaning in the field of anomaly detection or other relevant fields. The terms "about," "substantially", "similar to", "similar", or "approximately" are used to indicate a deviation from the stated property or numerical value within which the deviation has little to no influence of the corresponding function, property, or attribute of the structure being described. In an illustrated example, where a dimensional parameter is described as "substantially equal" to another dimensional parameter, the term "substantially" is intended to reflect that the two dimensions being compared can be unequal within a tolerable limit, such as a fabrication tolerance. In the present disclosure, "ranges" refers to a range of values between the two stated extents and/or including one of the two stated extents.

Disjunctive language such as the phrase "at least one of X, Y, or Z," unless specifically stated otherwise, is intended to be understood within the context as used in general to present that an item, term, etc., may be either X, Y, or Z, or any combination thereof (i.e., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method comprising:

receiving a request from an edge device;

providing, to a generative model in a prompt, the request;

determining, based at least in part on an output of the generative model, a negative response condition in accordance with a comparison of a first similarity score with a first pre-determined threshold;

comparing natural language information to a first graph network in accordance with a first pre-defined degree of separation, wherein the first graph network comprises a first set of nodes that represent a plurality of entities and a first set of edges that represent relationships between the plurality of entities and the natural language information comprises at least one of a portion of the output or a portion of the request;

determining a second similarity score based at least in part by comparing natural language text of a second set of nodes with the natural language information, wherein the second set of nodes do not occur in the first graph network and the second similarity score represents similarity between at least the natural language information and first metadata associated with the second set of nodes;

extracting second metadata from the second set of nodes based at least in part on the second similarity score being in accordance with a second pre-determined threshold, wherein the second set of nodes is within a second pre-defined degree of separation different from the first pre-defined degree of separation;

creating a second graph network based at least in part by creating edges between i) nodes of the second set of nodes, ii) the first set of nodes, or both i) and ii), that represent relationships between nodes of the second set of nodes and/or the first set of nodes, wherein the second graph network is different than the first graph network;

generating a response to the request by accessing particular metadata of the second metadata associated with at least one node of the second set of nodes by extracting and formatting contextual natural language from the particular metadata; and providing the response including the particular metadata to the edge device.

2. The computer-implemented method of claim 1, further comprising:

deploying the second graph network to a cloud environment that hosts the first graph network or the second graph network; and updating one or more skills associated with a chat bot that received the request based at least in part on the second graph network.

3. The computer-implemented method of claim 1, wherein the first pre-defined degree of separation includes two or fewer edges, and the second pre-defined degree of separation includes at least one edge more than the first pre-defined degree of separation, and wherein the negative response condition indicates a lack of a response or a non-response condition.

4. The computer-implemented method of claim 1, wherein the request is received by a first chat bot, the computer-implemented method further comprising:

creating a new skill for the first chat bot based at least in part on the second metadata or the response; and storing the new skill in a cloud environment for retrieval by a second chat bot different from the first chat bot.

5. The computer-implemented method of claim 1, further comprising:

extracting portions of information from the second metadata;

transforming the portions of information into plain English summary with a context associated with the request; and inserting one or more hyperlinks into the plain English summary in accordance with documents associated with the second metadata, wherein the response comprises the plain English summary, the one or more hyperlinks, or both.

6. The computer-implemented method of claim 1, further comprising:

creating a production generative model by updating the generative model, the second graph network, the second metadata, the response, or combinations thereof, as unlabeled training data; and deploying the production generative model in a cloud environment.

7. The computer-implemented method of claim 1, further comprising:

receiving, from the edge device, a second request associated with the response, the second request associated with controlling an asset associated with a first entity of the plurality of entities and the response;

controlling the asset associated with the first entity to transfer to a second entity of the plurality of entities; and updating the first graph network or the second graph network in accordance with the transfer.

8. A computing device, comprising:

one or more processors; and one or more memories storing computer-executable instructions that, when executed by the one or more processors, causes the one or more processors to:

receive a request from an edge device;

provide, to a generative model in a prompt, the request;

determine, based at least in part on an output of the generative model, a negative response condition in accordance with a comparison of a first similarity score with a first pre-determined threshold;

compare natural language information to a first graph network in accordance with a first pre-defined degree of separation, wherein the first graph network comprises a first set of nodes that represent a plurality of entities and a first set of edges that represent relationships between the plurality of entities and the natural language information comprises at least one of a portion of the output or a portion of the request;

determine a second similarity score based at least in part by comparing natural language text of a second set of nodes with the natural language information, wherein the second set of nodes do not occur in the first graph network and the second similarity score represents similarity between at least the natural language information and first metadata associated with the second set of nodes;

extract second metadata from the second set of nodes based at least in part on the second similarity score being in accordance with a second pre-determined threshold, wherein the second set of nodes is within a second pre-defined degree of separation different from the first pre-defined degree of separation;

create a second graph network based at least in part by creating edges between i) nodes of the second set of nodes, ii) the first set of nodes, or both i) and ii), that represent relationships between nodes of the second set of nodes and/or the first set of nodes, wherein the second graph network is different than the first graph network;

generate a response to the request by accessing particular metadata of the second metadata associated with at least one node of the second set of nodes by extracting and formatting contextual natural language from the particular metadata; and provide the response including the particular metadata to the edge device.

9. The computing device of claim 8, wherein the instructions further cause the processor to:

deploy the second graph network to a cloud environment that hosts the first graph network or the second graph network; and update one or more skills associated with a chat bot that received the request based at least in part on the second graph network.

10. The computing device of claim 8, wherein the first pre-defined degree of separation includes two or fewer edges, and the second pre-defined degree of separation includes at least one edge more than the first pre-defined degree of separation, and wherein the negative response condition indicates a lack of a response or a non-response condition.

11. The computing device of claim 8, wherein the request is received by a first chat bot, wherein the instructions further cause the processor to:

create a new skill for the first chat bot based at least in part on the second metadata or the response; and store the new skill in a cloud environment for retrieval by a second chat bot different from the first chat bot.

12. The computing device of claim 8, wherein the instructions further cause the processor to:

extract portions of information from the second metadata;

transform the portions of information into plain English summary with a context associated with the request; and insert one or more hyperlinks into the plain English summary in accordance with documents associated with the second metadata, wherein the response comprises the plain English summary, the one or more hyperlinks, or both.

13. The computing device of claim 8, wherein the instructions further cause the processor to:

create a production generative model by updating the generative model, the second graph network, the second metadata, the response, or combinations thereof, as unlabeled training data; and deploy the production generative model in a cloud environment.

14. The computing device of claim 8, wherein the instructions further cause the processor to:

receive, from the edge device, a second request associated with the response, the second request associated with controlling an asset associated with a first entity of the plurality of entities and the response;

control the asset associated with the first entity to transfer to a second entity of the plurality of entities; and update the first graph network or the second graph network in accordance with the transfer.

15. A non-transitory computer-readable storage medium storing computer-executable instructions that, when executed with one or more processors of a computing device, causes the one or more processors to:

receive a request from an edge device;

provide, to a generative model in a prompt, the request;

determine, based at least in part on an output of the generative model, a negative response condition in accordance with a comparison of a first similarity score with a first pre-determined threshold;

compare natural language information to a first graph network in accordance with a first pre-defined degree of separation, wherein the first graph network comprises a first set of nodes that represent a plurality of entities and a first set of edges that represent relationships between the plurality of entities and the natural language information comprises at least one of a portion of the output or a portion of the request;

determine a second similarity score based at least in part by comparing natural language text of a second set of nodes with the natural language information, wherein the second set of nodes do not occur in the first graph network and the second similarity score represents similarity between at least the natural language information and first metadata associated with the second set of nodes;

extract second metadata from the second set of nodes based at least in part on the second similarity score being in accordance with a second pre-determined threshold, wherein the second set of nodes is within a second pre-defined degree of separation different from the first pre-defined degree of separation;

create a second graph network based at least in part by creating edges between i) nodes of the second set of nodes, ii) the first set of nodes, or both i) and ii), that represent relationships between nodes of the second set of nodes and/or the first set of nodes, wherein the second graph network is different than the first graph network;

generate a response to the request by accessing particular metadata of the second metadata associated with at least one node of the second set of nodes by extracting and formatting contextual natural language from the particular metadata; and provide the response including the particular metadata to the edge device.

16. The non-transitory computer-readable storage medium of claim 15, wherein the instructions further cause the processor to:

deploy the second graph network to a cloud environment that hosts the first graph network or the second graph network; and update one or more skills associated with a chat bot that received the request based at least in part on the second graph network.

17. The non-transitory computer-readable storage medium of claim 15, wherein the first pre-defined degree of separation includes two or fewer edges, and the second pre-defined degree of separation includes at least one edge more than the first pre-defined degree of separation, and wherein the negative response condition indicates a lack of a response or a non-response condition.

18. The non-transitory computer-readable storage medium of claim 15, wherein the request is received by a first chat bot, wherein the instructions further cause the processor to:

create a new skill for the first chat bot based at least in part on the second metadata or the response; and store the new skill in a cloud environment for retrieval by a second chat bot different from the first chat bot.

19. The non-transitory computer-readable storage medium of claim 15, extract portions of information from the second metadata;

transform the portions of information into plain English summary with a context associated with the request; and insert one or more hyperlinks into the plain English summary in accordance with documents associated with the second metadata, wherein the response comprises the plain English summary, the one or more hyperlinks, or both.

20. The non-transitory computer-readable storage medium of claim 15, wherein the instructions further cause the processor to:

create a production generative model by updating the
generative model, the second graph network, the sec-
ond metadata, the response, or combinations thereof, as
unlabeled training data; and deploy the production generative model in a cloud envi-
ronment.

\*     \*     \*     \*     \*